(12) United States Patent
Nakao

(10) Patent No.: US 6,205,456 B1
(45) Date of Patent: Mar. 20, 2001

(54) SUMMARIZATION APPARATUS AND METHOD

(75) Inventor: Yoshio Nakao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/006,201

(22) Filed: Jan. 13, 1998

(30) Foreign Application Priority Data

Jan. 17, 1997 (JP) .................................................. 9-006777

(51) Int. Cl.⁷ ............................ G06F 17/30; G06F 15/00
(52) U.S. Cl. ............................................ 707/531; 707/3
(58) Field of Search ...................... 707/9, 1–6, 100–104, 707/500, 526, 515, 517, 530; 345/418, 326, 334, 340, 352, 507

(56) References Cited

U.S. PATENT DOCUMENTS

| | | | |
|---|---|---|---|
| 5,838,323 | * 11/1998 | Rose et al. ............................. | 345/349 |
| 5,918,240 | * 6/1999 | Kupiec et al. ......................... | 707/531 |
| 5,924,108 | * 7/1999 | Fein et al. ............................. | 707/531 |
| 5,963,940 | * 10/1999 | Liddy et al. ............................. | 707/5 |
| 5,983,216 | * 11/1999 | Kirsch et al. ............................. | 707/2 |
| 6,018,733 | * 1/2000 | Kirsch et al. ............................. | 707/3 |

FOREIGN PATENT DOCUMENTS

| | | |
|---|---|---|
| 0 631 245 | 12/1994 | (EP) . |
| 96/23265 | 8/1996 | (WO) . |

OTHER PUBLICATIONS

Patent Abstracts of Japan, No. 07129605, May 19, 1995.
T. Ball, "An Internet Difference Engine and Its Applications", *IEEE*, 1996, pp. 71–76.
M. Pazzani, "Learning From Hotlists and Coldlists", *IEEE*, 1995, pp. 492–495.

\* cited by examiner

*Primary Examiner*—Joseph H. Feild
*Assistant Examiner*—Alford W. Kindred
(74) *Attorney, Agent, or Firm*—Staas & Halsey, LLP

(57) ABSTRACT

A document summarization apparatus or method summarizes an electronic document written in a natural language, and generates an appropriate summary depending on user's focus and user's knowledge. The document summarization apparatus according to the present invention includes, for example, a focused information relevant portion extraction unit, a summary readability improvement unit, and a summary generation unit. The focused information relevant portion extraction unit extracts a portion related to two types of focused information in a document to be summarized based on the two types of focused information, that is, user-focused information as information focused by a user who uses a summary, and author-focused information as information emphasized by an author of the document to be summarized. In the document to be summarized, the summary readability improvement unit distinguishes user known information already known to a user, and information known through an access log regarded as already known to a user based on a document previously presented to the user when a summary is generated, from other information than these two types of information, and selects an important portion in the document to be summarized. The summary generation unit generates the summary of the document to be summarized based on the selection result of the summary readability improvement unit. Thus, a summary can be generated with both user-focused information and author-focused information can be included depending on the knowledge level of a user.

29 Claims, 31 Drawing Sheets

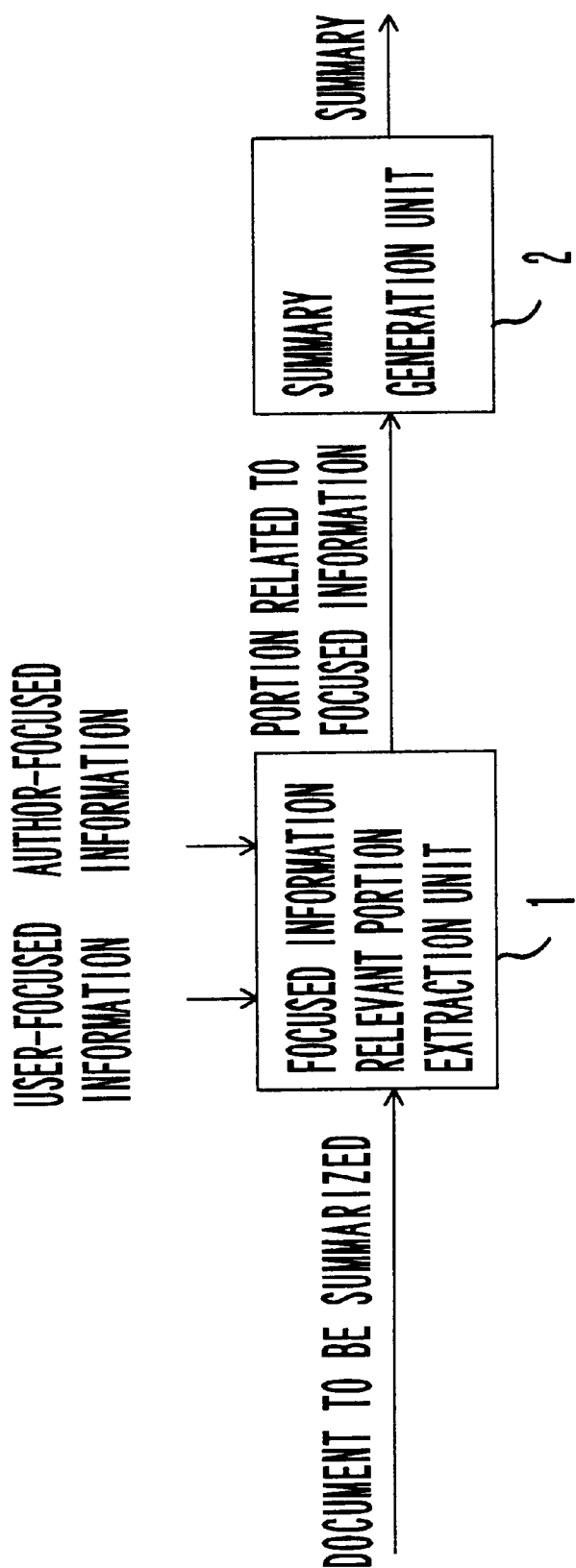
F I G. 1

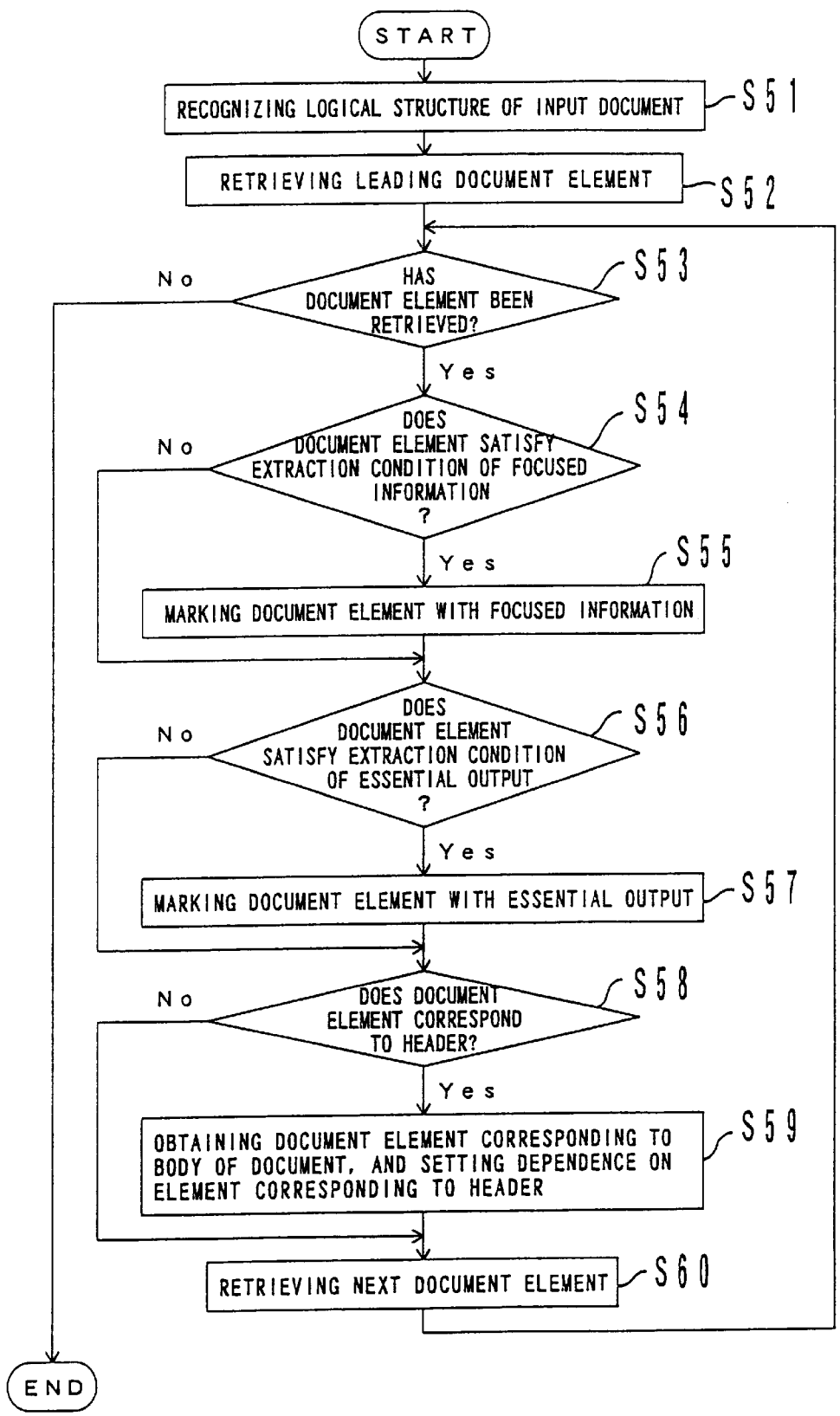
F I G. 8

Input Sentence: 東京都は大都市だ (Tokyo is a big city.)

| Headword (English Equivalent) | Part of Speech |
|---|---|
| 東 (east) | noun |
| 東京都 (Tokyo) | noun |
| 京都 (Kyoto) | noun |
| は (-) | particle wa |
| 大 (big) | prefix |
| 都市 (city) | noun |
| だ (-) | auxiliary verb da |

Candidate for Word: (refers to the table above)

FIG. 10

Input Sentence: Tokyo is the Japanese capital.

Candidate for Word:

| Headword | Base (Root) Form | Part of Speech |
|---|---|---|
| Tokyo | Tokyo | proper noun |
| is | be | be verb (the third person singular present form) |
| the | the | definite article |
| Japanese | Japanese | proper noun |
| Japanese | Japanese | adjective |
| capital | capital | noun |

F I G. 11

Input Sentence:   Tokyo is the Japanese capital.

Lexicons:

| | |
|---|---|
| NOUN → [Tokyo] | *Tokyo* is a NOUN. |
| VERB → [is] | *Is* is a VERB. |
| ART → [the] | *The* is an ART (article). |
| ADJ → [Japanese] | *Japanese* is an ADJ (adjective). |
| NOUN → [capital] | NOUN |

Rewriting Rules:

| | | |
|---|---|---|
| 1 | NP → ART ADJ NOUN | An NP (Noun Phrase) may consist of an ART, an ADJ and and an NOUN. |
| 2 | NP → NOUN | An NP (Noun Phrase) may consist of an NOUN. |
| 3 | VP → VERB NP | A VP (Verb Phrase) may consist of a VERB followed by an NP (Noun Phrase) |
| 4 | S → NP VP | A S (Sentence) consists of a NP follwed by a VP |

Output:

(S (NP (N [Tokyo]))   (VP (VERB [is])
                       (NP (ART [the]) (ADJ [Japanese]) (NOUN [capital]))))

FIG. 14

VERB: ANNOUNCE
SUBJECT: FUJITSU
OBJECT: NEW PERSONAL COMPUTER
DATE: MARCH 3, 1991
PLACE: JAPAN

FIG. 15

```
ANNOUNCE ─── SUBJECT ──→ FUJITSU
         └── OBJECT  ──→ PRODUCT ─── ATTRIBUTE ──→ NEW
                                 └── MODIFIER  ──→ PERSONAL COMPUTER
```

F I G.  1 6

SENTENCE 1: TARO-WA, KAZE-WO HIITANODE GAKKO-WO YASUNDA.
            (TARO WAS ABSENT FROM SCHOOL SINCE HE CAUGHT COLD.)
PREDICATE PHRASE 1: TARO-WA, / GAKKO-WO / YASUNDA.
                    (TARO / WAS ABSENT / FROM SCHOOL.)
PREDICATE PHRASE 2: KAZE-WO / HIITANODE (SINCE HE CAUGHT / COLD)
DEPENDENCE: <JYUTSUGOKU1> ← IZON — <JYUTSUGOKU2>
            (PREDICATE PHRASE 2 DEPENDING ON PREDICATE PHRASE 1)

SENTENCE 2: HANAKO-WA, TARO-GA OKUTTEKURETA TEGAMI-WO DAIJISOUNI SHIMATTA.
            (HANAKO TENDERLY PUT AWAY THE LETTER SENT FROM TARO.)
PREDICATE PHRASE 1: HANAKO-WA, / TEGAMI-WO / DAIJISOUNI / SHIMATTA.
                    (HANAKO / TENDERLY / PUT AWAY / THE LETTER.)
PREDICATE PHRASE 2: TARO-GA / OKUTTEKURETA (SENT FROM / TARO)
DEPENDENCE: <JYUTSUGOKU1> ← IZON — <JYUTSUGOKU2>
            (PREDICATE PHRASE 2 DEPENDING ON PREDICATE PHRASE 1)

BEFORE ISOLATION OF TOPIC PHRASE

F I G.   1 7 A

SENTENCE 1: TARO-WA, KAZE-WO HIITANODE GAKKO-WO YASUNDA.
            (TARO WAS ABSENT FROM SCHOOL SINCE HE CAUGHT COLD.)
TOPIC PHRASE (REPRESENTATIVE): TARO-WA, (TARO)
PREDICATE PHRASE 1(MAIN): GAKKO-WO / YASUNDA. (WAS ABSENT FROM / SCHOOL.)
PREDICATE PHRASE 2: KAZE-WO / HIITANODE (SINCE HE CAUGHT / COLD)
DEPENDENCE: <SHUDAIKU> ← IZON — <JYUTSUGOKU1> ←IZON —<JYUTSUGOKU2>
            (PREDICATE PHRASE 2 DEPENDING ON PREDICATE PHRASE 1,
            AND PREDICATE PHRASE 1 DEPENDING ON TOPIC PHRASE)

SENTENCE 2: HANAKO-WA, TARO-GA OKUTTEKURETA TEGAMI-WO DAIJISOUNI SHIMATTA.
            (HANAKO TENDERLY PUT AWAY THE LETTER SENT FROM TARO.)
TOPIC PHRASE (REPRESENTATIVE): HANAKO-WA, (HANAKO)
PREDICATE PHRASE 1(MAIN): TEGAMI-WO / DAIJISOUNI / SHIMATTA.
                          (TENDERLY / PUT AWAY / THE LETTER.)
PREDICATE PHRASE 2: TARO-GA / OKUTTEKURETA (SENT FROM / TARO)
DEPENDENCE: <SHUDAIKU> ← IZON — <JYUTSUGOKU1> ←IZON —<JYUTSUGOKU2>
            (PREDICATE PHRASE 2 DEPENDING ON PREDICATE PHRASE 1,
            AND PREDICATE PHRASE 1 DEPENDING ON TOPIC PHRASE)

AFTER ISOLATION OF TOPIC PHRASE

F I G.   1 7 B

HEADER : FUJITSU STRARTS SALES OF NEW INFORMATION APPARATUS

BODY : ON THE 30TH OF ...., FUJITSU ANNOUNCED THE START OF SALES OF ITS NEW INFORMATION APPARATUS IN MARCH

| PROPOSITION CONTAINED IN HEADER | PROPOSITION CONTAINED IN BODY |
|---|---|
| (FUJITSU, ANNOUNCE)<br>(NEW INFORMATION APPARATUS, ANNOUNCE) | (FUJITSU, ANNOUNCE)<br>(NEW INFORMAITON APPARATUS, ANNOUNCE)<br>(ANNOUNCE, START)<br>(MARCH, START)<br>(FUJITSU, ANNOUNCE)<br>(30TH, ANNOUNCE)<br>(START, ANNOUNCE) |

F I G. 2 0

| | |
|---|---|
| PUBLICATION NUMBER | JAPANESE LAID-OPEN PATENT PUBLICATION (TOKKAIHEI) NO. 06-259424 |
| TITLE OF INVENTION | DOCUMENT DISPLAY APPARATUS, DOCUMENT SUMMARIZING APPARATUS, AND DIGITAL COPY APPARATUS |
| INVENTOR | MASAYUKI KAMEDA (RICO) |
| EXTRACTION OF ABSTRACT | [DOCUMENT] , [DISPLAY] ,AND [APPARATUS] ACCORDING TO THE PRESENT INVENTION HAS THE FUNCTION OF [DISPLAYING] THE DOCUMENT CONTAINING A HEADER AND A BODY. AN ANALYSIS UNIT 1 ANALYZES THE HEADER. A RECOGNITION UNIT 2 RECOGNIZES A WORD IN THE HEADER ANALYZED BY THE ANALYSIS UNIT 1 FROM THE BODY. |
| CHARACTERISTIC WORD | APPARATUS, DISPLAY, DOCUMENT |
| PUBLICATION NUMBER | JAPANESE LAID-OPEN PATENT PUBLICATION (TOKKAIHEI) NO. 07-036896 |
| TITLE OF INVENTION | METHOD AND APPARATUS FOR SUMMARIZING DOCUMENT |
| INVENTOR | M.MARAGRET WITHGOT, DOUGLAS R. CUTTING (XEROX) |
| EXTRACTION OF ABSTRACT | ··· THE METHOD ACCORDING TO THE PRESENT INVENTION IS TO AUTOMATICALLY GENERATE [SUMMARY] BY SELECTING AN AREA FOR [DOCUMENT] . |
| CHARACTERISTIC WORD | DOCUMENT, METHOD, SUMMARY |
| PUBLICATION NUMBER | JAPANESE LAID-OPEN PATENT PUBLICATION (TOKKAIHEI) NO. 08-297677 |
| TITLE OF INVENTION | AUTOMATIC METHOD FOR GENERATING A SUMMARY OF A SUBJECT |
| INVENTOR | FRANCINE R. CHANE (XEROX) |
| EXTRACTION OF ABSTRACT | [OBJECT] TO PROVIDE A METHOD OF AUTOMATICALLY GENERATING THE [SUMMARY] OF THE [SUBJECT] OF A MACHINE-READABLE DOCUMENT. |
| CHARACTERISTIC WORD | SUBJECT, GENERATION, METHOD, SUMMARY |
| PUBLICATION NUMBER | JAPANESE LAID-OPEN PATENT PUBLICATION (TOKKAIHEI) NO. 06-215049 |
| TITLE OF INVENTION | DOCUMENT SUMMARIZATION APPARATUS |
| INVENTOR | TAKAO INUI, IKUO KESHI, KEN'ICHIRO ISHIKURA (SHARP) |
| EXTRACTION OF ABSTRACT | A DOCUMENT PROCESS UNIT 4 REFERS TO EACH INTER-CONTEXT-VECTOR DISTANCE, AND GENERATES TWO TYPES OF GIST OF THE PARAGRAPH CLOSEST TO THE [DOCUMENT] AND A PLURALITY OF SENTENCES CLOSE TO THE [DOCUMENT] ,AND TWO TYPES OF [SUMMARY] OF THE SENTENCE IN EACH PARAGRAPH CLOSEST TO THE [DOCUMENT] AND THE SENTENCE CLOSEST TO EACH PARAGRAPH. |
| CHARACTERISTIC WORD | DOCUMENT, SUMMARY |
| PUBLICATION NUMBER | JAPANESE LAID-OPEN PATENT PUBLICATION (TOKKAIHEI) NO. 07-182373 |
| TITLE OF INVENTION | DOCUMENT INFORMATION RETRIEVAL APPARATUS AND DOCUMENT RETRIEVAL RESULT DISPLAY METHOD |
| INVENTOR | KAZUO SUMITA, SEIJI MIIKE, KENJI ONO, YOUICHI TAKEBAYASHI, KIMITO TAKEDA, ETSUO ITO (TOSHIBA) |
| EXTRACTION OF ABSTRACT | THE [DOCUMENT] , [INFORMATION] , [RETRIEVAL] ,AND [APPARATUS] ARE PROVIDED SO THAT THE CONTENTS OF THE [DOCUMENT] [RETRIEVED] BY THE USER CAN BE EASILY UNDERSTOOD AND THE USER CAN IMMEDIATELY DETERMINE THE NECESSITY OF THE INFORMATION IN THE DOCUMENT BY PRESENTING A [SUMMARY] SENTENCE BASED ON THE REQUEST FROM THE USER, NOT BY [DISPLAYING] THE [RETRIEVAL] RESULT IN ORIGINAL TEXT |
| CHARACTERISTIC WORD | RETRIEVAL, INFORMATION, APPARATUS, DISPLAY, DOCUMENT, SUMMARY |
| PUBLICATION NUMBER | JAPANESE LAID-OPEN PATENT PUBLICATION (TOKKAIHEI) NO. 07-044566 |
| TITLE OF INVENTION | ABSTRACT GENERATION APPARATUS |
| INVENTOR | KENJI ONO, KAZUO SUMITA, SEIJI MIIKE (TOSHIBA) |
| EXTRACTION OF ABSTRACT | THE READABILITY AND NATURAL EXPRESSION OF AN [ABSTRACT] SENTENCE CAN BE IMPROVED BY INCLUDING A REFERRED-TO PORTION OF A REFERENCE EXPRESSION OR AN OMITTED PORTION INDICATOR IN AN [ABSTRACT] SENTENCE. A FORMAT ANALYSIS UNIT 1 ANALYZES AN ELECTRONIC INPUT [DOCUMENT] ,AND ANALYZES THE END OF A SENTENCE AND A PARAGRAPH, AND THE STRUCTURE OF A CHAPTER AND A SECTION, ETC. |
| CHARACTERISTIC WORD | ABSTRACT, SENTENCE |

FIG. 22

Title: The Apple Computer IS REORGANIZING THROUGH THE IMPLEMENTATION OF Windows.

G.Amelio HAS REFORMED THE ORGANIZATION OF THE COMPANY BY HALVING THE VARIATION OF THE Macintosh MODELS. AS A RESULT, THE DEVELOPMENT COST CAN BE REDUCED, AND THE 3000 EMPLOYEES HAVE BEEN LAID OFF, THEREBY REORGANIZING THE Apple Computer. ...HOWEVER, SINCE Hancock IS FAMILIAR WITH SOFTWARE AND A SUCCESSFUL REORGANIZATRION OF Apple DEPENDS ON Copland WHICH HAS BEEN DELAYED IN DEVELOPMENT, Hancock IS THE RIGHT PERSON IN THE RIGHT PLACE. ...IF THEY HAVE NEGOTIATED SUCCESSFULLY, Microsoft WILL DESIGN QuickTime TO BE INCORPORATED INTO Internet Explorer, AND Apple WILL PROMOTE THEIR TECHNICAL SUPPORT OF MULTIMEDIA FOR Windows.

AN EXAMPLE IN WHICH A CONCEPT KNOWLEDGE
CRITERION IS NOT APPLIED

FIG. 23A

Title: The Apple Computer IS REORGANIZING THROUGH THE IMPLEMENTATION OF Windows.

G.Amelio HAS REFORMED THE ORGANIZATION OF THE COMPANY BY HALVING THE VARIATION OF THE Macintosh MODELS. AS A RESULT, THE DEVELOPMENT COST CAN BE REDUCED, AND THE 3000 EMPLOYEES HAVE BEEN LAID OFF, THEREBY REORGANIZING THE Apple Computer. Amelio INVITES EXTERNAL PERSONS TO IMPORTANT POSITIONS OF THE Apple Computer, AND APPOINTED Ellen Hancock AT THE AGE OF 53 TO A CHIEF TECHNOLOGY OFFICER, THAT IS, THE TOP MANAGER IN THE RESEARCH AND DEVELOPMENT DEPARTMENT. ...HOWEVER, SINCE Hancock IS FAMILIAR WITH SOFTWARE AND A SUCCESSFUL REORGANIZATION OF Apple DEPENDS ON Copland WHICH HAS BEEN DELAYED IN DEVELOPMENT, Hancock IS THE RIGHT PERSON IN THE RIGHT PLACE. ...IF THEY HAVE NEGOTIATED SUCCESSFULLY, Microsoft WILL DESIGN QuickTime TO BE INCORPORATED INTO Internet Explorer, AND Apple WILL PROMOTE THEIR TECHNICAL SUPPORT OF MULTIMEDIA FOR Windows.

AN EXAMPLE IN WHICH THE CONCEPT KNOWLEDGE
CRITERION IS APPLIED TO A TOPIC PHRASE

FIG. 23B

| SENTENCE NUMBER | AMOUNT OF FOCUSED INFORMATION | AMOUNT OF NEW INFORMATION | SENTENCE |
|---|---|---|---|
| 1 | 1.1 | 9.9 | [G.Amelio] HAS [REFORMED] THE [ORGANIZATION] OF THE [COMPANY] BY HALVING THE VARIATION OF THE [Macintosh] [MODELS]. AS A RESULT, THE DEVELOPMENT COST CAN BE [REDUCED], AND THE 3000 [EMPLOYEES] HAVE BEEN [LAID OFF], THEREBY REORGANIZING THE [[AppleComputer]]. |
| 3 | 1.1 | 3.3 | THIS IS THE MOST [IMPORTANT] [POSITION] IN [[REORGANIZING]] THE [[Apple]]. |
| 11 | 1.1 | 8.9 | HOWEVER, SINCE [Hancock] IS FAMILIAR WITH [SOFTWARE] AND A [SUCCESSFUL] [[REORGANIZATION]] OF [Apple] DEPENDS ON [Copland] WHICH HAS BEEN DELAYED IN [DEVELOPMENT], [Hancock] IS THE [RIGHT] [PERSON] IN THE RIGHT PLACE. |
| 21 | 1.1 | 5.5 | [Amelio] SEEMS TO TAKE A [REASONABLE] [ACTION] TO SUCCESSFULLY [[REORGANIZE]] [Apple], BUT IT WILL TAKE AT LEAST ONE FULL YEAR TO OUTPUT AN [APPARENT] RESULT. |
| 41 | 1.1 | 6.6 | [Apple] IS [[PROMOTING]] AN ACTIVE [STRATEGY] FOR [Macintosh] - [COMPATIBLE] PRODUCTS, AND PLANS TO [DELIVER] THE [PRODUCTS] STARTING SUMMER. |
| 72 | 2.2 | 8.8 | IF THEY HAVE [NEGOTIATED] SUCCESSFULLY, [MICROSOFT] WILL DESIGN [QuickTime] TO BE INCORPORATED INTO [Internet Explorer], AND [Apple] WILL [[PROMOTE]] THEIR [TECHNICAL] [SUPPORT] OF [MULTIMEDIA] FOR [[Windows]]. |
| 74 | 1.1 | 2.2 | UP TO NOW, [QuickTime] FOR [[Windows]] HAS ONLY THE ABILITY OF [REGENERATION] |

FIG. 24

| SENTENCE NUMBER | AMOUNT OF FOCUSED INFORMATION | AMOUNT OF NEW INFORMATION | SENTENCE |
|---|---|---|---|
| 1 | 1.1 | 9.9 | [G.Amelio] HAS [REFORMED] THE [ORGANIZATION] OF THE [COMPANY] BY HALVING THE VARIATION OF THE [Macintosh] [MODELS]. AS A RESULT, THE DEVELOPMENT COST CAN BE [REDUCED], AND THE 3000 [EMPLOYEES] HAVE BEEN [LAID OFF], THEREBY REORGANIZING THE [[AppleComputer]]. |
| 3 | 1.1 | 3.3 | THIS IS THE MOST [IMPORTANT] [POSITION] IN [[REORGANIZING]] THE [[Apple]]. |
| 11 | 1.1 | 8.9 | HOWEVER, SINCE [Hancock] IS FAMILIAR WITH [SOFTWARE] AND A [SUCCESSFUL] [REORGANIZATION]] OF [Apple] DEPENDS ON [Copland] WHICH HAS BEEN DELAYED IN [DEVELOPMENT], [Hancock] IS THE [RIGHT] [PERSON] IN THE RIGHT PLACE. |
| 21 | 1.1 | 5.5 | [Amelio] SEEMS TO TAKE A [REASONABLE] [ACTION] TO SUCCESSFULLY [[REORGANIZE]] [Apple], BUT IT WILL TAKE AT LEAST ONE FULL YEAR TO OUTPUT AN [APPARENT] RESULT. |
| 41 | 0.0 | 6.6 | [Apple] IS [[PROMOTING]] AN ACTIVE [STRATEGY] FOR [Macintosh] - [COMPATIBLE] PRODUCTS, AND PLANS TO [DELIVER] THE [PRODUCTS] STARTING SUMMER. |
| 72 | . | . | (SELECTED) |
| 74 | 0.0 | 2.2 | UP TO NOW, [QuickTime] FOR [[Windows]] HAS ONLY THE ABILITY OF [REGENERATION]. |

FIG. 25

| SENTENCE NUMBER | AMOUNT OF FOCUSED INFORMATION | AMOUNT OF NEW INFORMATION | SENTENCE |
|---|---|---|---|
| 1 | 1.1 | 9.9 | [G.Amelio] HAS [REFORMED] THE [ORGANIZATION] OF THE [COMPANY] BY HALVING THE VARIATION OF THE [Macintosh] [MODELS]. AS A RESULT, THE DEVELOPMENT COST CAN BE [REDUCED], AND THE 3000 [EMPLOYEES] HAVE BEEN [LAID OFF], THEREBY REORGANIZING THE [AppleComputer]. |
| 2 | 0.0 | 11.11 | [Amelio] INVITES EXTERNAL [PERSONS] TO [IMPORTANT] [POSITIONS] OF THE [Apple] COMPUTER, AND [APPOINTED] [Ellen Hancock] AT THE AGE OF 53 TO A [Chief Technology Officer], THAT IS, THE [TOP] [MANAGER] IN THE [RESEARCH AND DEVELOPMENT] DEPARTMENT. |
| 3 | 1.1 | 3.3 | THIS IS THE MOST [IMPORTANT] [POSITION] IN [[REORGANIZING]] THE [[Apple]]. |
| 11 | 1.1 | 8.9 | HOWEVER, SINCE [Hancock] IS FAMILIAR WITH [SOFTWARE] AND A [SUCCESSFUL] [REORGANIZATION] OF [Apple] DEPENDS ON [Copland] WHICH HAS BEEN DELAYED IN [DEVELOPMENT], [Hancock] IS THE [RIGHT] [PERSON] IN THE RIGHT PLACE. |
| 21 | 1.1 | 5.5 | [Amelio] SEEMS TO TAKE A [REASONABLE] [ACTION] TO SUCCESSFULLY [[REORGANIZE]] [Apple], BUT IT WILL TAKE AT LEAST ONE FULL YEAR TO OUTPUT AN [APPARENT] RESULT. |

(a) PORTIONS RELATED TO DEPENDENCE

SENTENCE 1 ← DEPENDENCE 〈 [Amelio] 〉 ← SENTENCE 2 ← DEPENDENCE 〈THIS〉 ← SENTENCE 3
 (b) DEPENDENCE RELATED TO SENTENCE 3
SENTENCE 1 ← DEPENDENCE 〈 [Amelio] 〉 ← SENTENCE 2 ← DEPENDENCE 〈 [Hancock] 〉 ← SENTENCE 11
 (c) DEPENDENCE RELATED TO SENTENCE 11
SENTENCE 1 ← DEPENDENCE 〈 [Amelio] 〉 ← SENTENCE 21
 (d) DEPENDENCE RELATED TO SENTENCE 21

F I G. 2 6

| SENTENCE NUMBER | AMOUNT OF FOCUSED INFORMATION | AMOUNT OF NEW INFORMATION | SENTENCE |
|---|---|---|---|
| 1 | 1.1 | 9.9 | [G.Amelio] HAS [REFORMED] THE [ORGANIZATION] OF THE [COMPANY] BY HALVING THE VARIATION OF THE [Macintosh] [MODELS]. AS A RESULT,THE DEVELOPMENT COST CAN BE [REDUCED],AND THE 3000 [EMPLOYEES] HAVE BEEN [LAID OFF],THEREBY REORGANIZING THE [[AppleComputer]]. |
| 3(+2+1) | 2.4 | 18.21 | THIS IS THE MOST [IMPORTANT] [POSITION] IN [[REORGANIZING]] THE [[Apple]]. |
| 11(+2+1) | 2.4 | 24.27 | HOWEVER, SINCE [Hancock] IS FAMILIAR WITH [SOFTWARE] AND A [SUCCESSFUL] [[REORGANIZATION]]OF [Apple] DEPENDS ON [Copland] WHICH HAS BEEN DELAYED IN [DEVELOPMENT], [Hancock] IS THE [RIGHT] [PERSON] IN THE RIGHT PLACE. |
| 21(+1) | 2.3 | 12.13 | [Amelio] SEEMS TO TAKE A [REASONABLE] [ACTION] TO SUCCESSFULLY [[REORGANIZE]] [Apple],BUT IT WILL TAKE AT LEAST ONE FULL YEAR TO OUTPUT AN [APPARENT] RESULT. |
| 41 | 1.1 | 6.6 | [Apple] IS [[PROMOTING]]AN ACTIVE [STRATEGY] FOR [Macintosh] - [COMPATIBLE] PRODUCTS, AND PLANS TO [DELIVER] THE [PRODUCTS] STARTING SUMMER. |
| 72 | 2.2 | 8.8 | IF THEY HAVE [NEGOTIATED] SUCCESSFULLY, [MICROSOFT] WILL DESIGN [QuickTime] TO BE INCORPORATED INTO [Internet Explorer], AND [Apple] WILL [[PROMOTE]] THEIR [TECHNICAL] [SUPPORT] OF [MULTIMEDIA] FOR [[Windows]]. |
| 74 | 1.1 | 2.2 | UP TO NOW, [QuickTime ] FOR [[Windows]]HAS ONLY THE ABILITY OF [REGENERATION]. |

F I G. 27

| SENTENCE NUMBER | AMOUNT OF FOCUSED INFORMATION | AMOUNT OF NEW INFORMATION | SENTENCE |
|---|---|---|---|
| 1 | | | (SELECTED) |
| 3 | 0.0 | 3.3 | THIS IS THE MOST [IMPORTANT] [POSITION] IN [[REORGANIZING]] THE [[Apple]]. |
| 11(+2+1) | | | (SELECTED) |
| 21 | 0.0 | 5.5 | [Amelio] SEEMS TO TAKE A [REASONABLE] [ACTION] TO SUCCESSFULLY [[REORGANIZE]] [Apple], BUT IT WILL TAKE AT LEAST ONE FULL YEAR TO OUTPUT AN [APPARENT] RESULT. |
| 41 | 1.1 | 6.6 | [Apple] IS [[PROMOTING]] AN ACTIVE [STRATEGY] FOR [Macintosh] - [COMPATIBLE] PRODUCTS, AND PLANS TO [DELIVER] THE [PRODUCTS] STARTING SUMMER. |
| 72 | 2.2 | 8.8 | IF THEY HAVE [NEGOTIATED] SUCCESSFULLY, [MICROSOFT] WILL DESIGN [QuickTime] TO BE INCORPORATED INTO [Internet Explorer], AND [Apple] WILL [[PROMOTE]] THEIR [TECHNICAL] [SUPPORT] OF [MULTIMEDIA] FOR [[Windows]]. |
| 74 | 1.1 | 2.2 | UP TO NOW, [QuickTime] FOR [[Windows]] HAS ONLY THE ABILITY OF [REGENERATION]. |

F I G. 28

KEYWORDS WHICH HAS NOT APPEARED YET ← HEADER KEYWORD
EXTRACTION RESULT ← BLANK
while KEYWORDS WHICH HAS NOT APPEARED YET IS NOT BLANK
  do (SELECTING IMPORTANT SENTENCE)
    EVALUATING IMPORTANCE OF SENTENCE BASED ON KEYWORDS WHICH HAS NOT APPEARED YET
    SELECTING SENTENCE(S) AT THE HIGHEST IMPORTANCE LEVEL
    (PROCESS TERMINATES UNLESS A SENTENCE CAN BE SELECTED).
    ADDING SELECTED SENTENCE TO EXTRACTION RESULT.
    REMOVING HEADER KEYWORDS APPEARED IN SELECTED SENTENCE FROM
    KEYWORDS WHICH HAS NOT APPEARED YET.
od

F I G. 29

F I G. 29

KEYWORDS WHICH HAS NOT APPEARED YET
EXTRACTION RESULT
IMPORTANCE (1) NUMBER OF DIFFERENT NOUNS MATCHING HEADER KEYWORD
(2) TOTAL NUMBER OF NOUNS MATCHING HEADER KEYWORD
(3) TOTAL NUMBER OF NOUNS NOT MATCHING HEADER KEYWORD

F I G. 30

FOCUSED CONCEPT LIST
SELECTION RESULT LIST
AMOUNT OF FOCUSED INFORMATION
AND AMOUNT OF NEW INFORMATION
(AMOUNT OF FIRST FOCUSED INFORMATION)
(AMOUNT OF SECOND FOCUSED INFORMATION)
(AMOUNT OF NEW INFORMATION)

F I G. 19

SUMMARIZATION APPARATUS AND METHOD

BACKGROUND OF THE INVENTION

1. Field of the Invention

The present invention relates to an apparatus for summarizing an electronic document written in a natural language, and has been developed to select and access a large volume of retrieved documents, and access, restructure (repeatedly use), and support the management process of a large volume of accumulated documents.

Recently, documents have been stored on electronic media, and an explosively-increasing number of document s are accessed and repeatedly used on computers using new document communications media such as the Internet/Intranet, etc. Under the circumstances, the technological development is accompanied by a larger volume and a larger variety of technological documents, thereby increasing the number of requests for accumulating and repeatedly-using a large volume of documents.

With such a large volume of documents, the effectiveness of each document should be quickly determined to select an appropriate document to the purpose. To attain this, it i s necessary to display a list of documents together with the information implying the contents of the documents. The information to the purpose can be a title or an abstract of a document. However, the title may not practically represent the contents of the document, or an abstract may be missing. When a document is accessed online, the number of characters to be displayed is limited. Therefore, an abstract may not be appropriately displayed because it contains too many characters. Thus, a technology of automatically generating an appropriate summary is earnestly demanded.

When documents are used efficiently and repeatedly, a large volume of documents should be properly classified and arranged when accumulated. At this time, an appropriate summarization is required to quickly understand the contents of a new document to be classified, obtain the outline of the classification so that the administrator of the accumulated document can improve the classification system, and to inform a user unfamiliar with the classification system of the actual classification.

The feature of the present invention is to adjust a summarization result using the document summarization apparatus depending on the focused concept and the known concept of the user.

2. Description of the Related Art

There have been two major methods of generating the summary of a document in the conventional document summarization technology. The first method is to recognize and extract an important portion in a document (normally the logical elements of a document such as a sentence, a paragraph, a section, etc., and hereinafter referred to as a sentence), and generate a summary. The second method is to prepare a pattern of information to be extracted as a summary and make a summary after extracting words or phrases in the document according to the condition of the pattern or extracting sentences according to the pattern. Since the second method is little related to the present invention, the first method is described below.

The first method is further divided into a few submethods depending on what is the key to the evaluation of the importance of a sentence. A typical method depends on:

1. occurrence and distribution of words in a document; and
2. coherence relation between sentences and position where a sentence appears.

(The importance of a sentence can also be evaluated by the syntax pattern of a sentence, but this method is omitted here because it hardly relates to the present invention.)

In method 1, that is, the method depending on the occurrence and distribution of words in a document, the importance of a word (phrase) contained in a document is normally determined first, and then the importance of the sentence is evaluated depending on the number of important words contained in the sentence. Then, an important sentence can be selected and a summary is generated. The importance of a word is calculated by using the occurrence of the word in a document, which can be weighed by taking into account the deviation of the occurrence of the word from the occurrence of the word in a common document set or the position where the word appears (a word appearing in a title is regarded as an important word, etc.). Normally, a focused word is an independent word in Japanese (especially a noun), and a content word in English. An independent word and a content word refer to a word having a substantial meaning such as a noun, adjective, verb, etc. that can be distinguished from syntactic words such as a preposition, an auxiliary, etc. The formal definition of an independent word in Japanese implies a word which can form part of an independent section in a sentence. This is a little different from the description above, but the purpose of limiting a focused word to an independent word is described above.

For example, method 1 is described in the following document.

In the Japanese Laid-open Patent Publication (Tokkaihei) No. 06-259424 "Document Display Apparatus, Document Summarization Apparatus, and Digital Copy Apparatus" and the following document 1 by the same author, a summary is generated by extracting a portion containing a number of words contained in the title as an important portion related to the title.

Document 1: Masayuki Kameda, "Extraction of Important Keyword and Important Sentence by Pseudokeyword Correlation Method", disclosed in the second annual meeting, Association for Natural Language Processing, pp. 97–100, March 1996.

In the Japanese Laid-open Patent Publication (Tokkaihei) No. 07-36896 "Document Summarization Method and Apparatus", a seed for an important representation is selected based on the complexity (word length, etc.) of the representation (word, etc.) in a document, and a summary is generated by extracting a sentence containing a larger number of important seeds.

In the Japanese Laid-open Patent Publication (Tokkaihei) No. 08-297677 "Automatic Method of Generating Summary of Subject", words of main subjects are recognized in order from the highest occurrence of a word in a document, and a summary is generated by extracting a sentence containing a larger number of important subject words.

In the Japanese Laid-open Patent Publication (Tokkaihei) No. 06-215049 "Document Summarization Apparatus", a summary is generated by extracting a sentence from a sentence or paragraph having a feature vector similar to that of the entire document after applying a vector space model often used in determining the relevance between a retrieval result and a question sentence. A vector space model refers to representing a feature of a document and a query sentence using a feature vector indicating the existence or occurrence of a word in the document and the query sentence after assigning a dimension (axis) to each keyword or each meaning element of a word.

In method 2 depending on the coherence relation between sentences and the position of the sentence, an important sentence is selected by determining the (relative) importance of the sentence based on the conjunction (also referred to as the coherence relation) of sentences such as 'and', 'but', 'then', etc., and the position where a sentence appears in a document. This method is described in, for example, the Japanese Laid-open Patent Publication (Tokkaihei) No. 07-182373 "Document Information Retrieval Apparatus and Document Retrieval Result Display Method" and the following document 2 by the same applicant and document 3 by other applicants.

Document 2: Kazuo Sumita, Tetsuo Tomono, Kenji Ono, and Seiji Miike. "Automatic abstract generation based on document structure analysis and its evaluation as document retrieval presentation function". Transactions of the Institute of Electronics, Information and Communication Engineers, Vol.J78-D-II, No. 3, pp.511–519, March 1995 (in Japanese).

Document 3: Kazuhide Yamamoto, Shigeru Masuyama, and Shozo Naito. "GREEN: An experimental system generating summary of Japanese editorials by combining multiple discourse characteristics". IPSJ SIG Notes NL-99-3, Information Processing Society of Japan, January 1994 (in Japanese).

In addition to the technology of generating a summary of an entire document as described above, there is a technology of presenting a user-focused portion to support the determination of the effectiveness of each document. As well-known technologies, a method of displaying the surrounding portion of a retrieved word referred to as a keyword in context (KWIC), and a similar method of displaying the vicinity of a retrieved word are popularly used.

There also is a method of presenting only a specific portion depending on a user's purpose such as a portion describing the background of a study in a thesis, the first paragraph of a newspaper, etc. Examples of this method are described in the Japanese Laid-open Patent Publication (Tokkaihei) No. 07-182373, document 3, and documents 4 and 5 by another applicant. However, in these technologies, a portion assigned a special function in a logical structure of a document is selected using a field-specific document configuration and wording as a clue. Therefore, a user-focused portion is not specifically selected, nor the portion closely related to the user-focused portion can be presented.

Document 4: Noriko Kando. "Functional structure analysis of research articles selected from three specialties: Automatic category assignment." Library and Information Science, No.31, pp. 25–38, 1993 (in Japanese).

Document 5: Noriko Kando. "Functional structure analysis of the research articles and its applications." Journal of Japan Society of Library Science, Vol.40, No.2, PP.49–61, June 1994 (in Japanese).

The factors of lowering the readability of a summary can be redundant representations, unknown words to users, unsolved anaphoric expressions (such as 'it', 'this', 'that'), etc.

Among the above listed factors, redundant representations can be reduced by the method of deleting excess modifier elements by the heuristics based on the wording characteristics and correlation between modifier elements and modified elements, a distance between a modifier element and a modified element. For example, the above described document 3 presents a heuristics of deleting the first modifier element in the case that two or more elements modify a same noun to summarize a Japanese newspaper article. The following document 6 by the same authors presents another heuristics of deleting an introduction of a successive article in a series of relevant articles if 70% or more of nouns in the introduction are occurred in an introduction of the former articles.

Document 6: Takahiro Funasaka, Kazuhide Yamamoto, and Shigeru Masuyama. "Relevant newspaper articles summarization by redundancy reduction." IPSJ SIG Notes NL-114-7, Information Processing Society of Japan, July 1996 (in Japanese).

It is obvious that definitions and descriptions of words, if any, should be included in a summary to solve the problem of unknown words.

For an anaphoric expression, its antecedent is searched for and the anaphoric expression is replaced with the antecedent or a portion containing the antecedent is included in a summary so that the summary can be easily understood. The antecedent of the anaphoric expression can be identified by a method referred to as a centering method. This method makes a list of centers that comprises probable elements (centers) of a sentence to be antecedents of anaphoric expressions in the subsequent sentences. The elements probability to be an antecedent is calculated mainly by its syntactic role in a sentence, such as subject, direct object, etc. Then, the method resolves an anaphoric expression by selecting the most probable element from the list with the restriction of agreement of number, gender, etc. In a similar method, a center is also referred to as a focus. However, no technologies can obtain a perfect result. The centering methods are described in the following documents.

Document 7: Megumi Kameyama. A property-sharing constraint in centering. In Proceeding of the 24th Annual Meeting of Association for Computational 1 Linguistics, pp.200–206, 1986.

Document 8: Susan E. Brennan, Marilyn W. Friedman, and Carl J. Pollard. A centering approach to pronouns. In Proceedings of the 25th Annual Meeting of Association for Computational Linguistics, pp. 155–162, 1987.

According to the above described Japanese Laid-open Patent Publications (Tokkaihei) No. 07-182373 and No. 07-44566 "Abstract Generation Apparatus" by the same applicants, the method is implemented to estimate the position of the definition of an unknown word and an antecedent of an anaphoric expression, and a hyper-textual link is set based on the original word or an anaphoric expression, thereby realizing a user's convenience.

To select an effective document from a large volume of documents, it is important to inform a user how the author of a document treats a topic relevant to the user-requested information. It is helpful for a user to determine the document relevance. In a retrieval system, user-requested information is often represented as a query sentence or a query expression using a keyword. However, user-requested information is not fully described in those forms. A document containing a word in a query sentence or a query expression does not necessarily supply the user-requested information. For example, when a patent gazette is searched using a keyword 'translation,' a retrieval result may contain a large number of patents about the translation of machine language although the user requests to obtain information about the patents relating to the translation of sentences in a natural language. In this case, presenting the word 'translation' in a context may be able to correctly support the selection of a document. The above described KWIC can be used for these purposes, but it is difficult to grasp the flow of a logic because only a physical vicinity is indicated, and a concise summary to the purpose cannot be easily prepared.

From this point of view, only the importance of a sentence in a document is taken into account in determining whether or not the sentence is included in a summary by the conventional summarization technology as described above. Therefore, a user's request is not considered. As a result, if a keyword matches an unimportant portion of a document, such as an example in a linguistic document, an automatic generated summary of the retrieved document makes a user confused because it does not contain the portion relevant to the user's request.

Described below is a further problem with the linguistic document. In a linguistic document, the formal nature of a language is discussed, and the contents of an example given in the document does not have to be related to the linguistic discussion. For example, the Japanese sentences "An elephant has a long nose." is frequently cited linguistic examples. When a user searches for information about animals, a document containing such examples can be retrieved. Since the document is a linguistic document, the occurrence of words relating to animals is small when the frequency of the words in the document is checked, and it is figured out that an elephant is not an important word. If an automatically-generated summary is displayed as a retrieval result based on the frequency distribution, such examples are hardly contained in the summary, thereby makes a user confused. That is, when a keyword 'elephant' is input, such a linguistic document may be retrieved, but is not contained in the display (automatically-generated summary) of a retrieval result, and the user cannot understand why such a word could be retrieved. On the other hand, when only the vicinity of a keyword is displayed, only an example is displayed and the user cannot understand what the document is about because only an example portion is displayed.

Another problem with the conventional summarization technology is that it includes no units for generating a summary depending on a user's knowledge level. Since a knowledge level depends on each user, the definitions and descriptions should be prepared for a summary according to each user's knowledge level of technical terms. Otherwise, a user of a high knowledge level may find a redundant summary while a user of a low knowledge level will hardly understand a difficult summary.

SUMMARY OF THE INVENTION

The present invention aims at solving the problem that a user-focused object is not taken into account when a summary is generated, and the problem that a user's knowledge level is not taken into account. That is, the present invention aims at providing a document summarization apparatus and method for automatically generating a summary appropriate for each user by adjusting the contents of the summary depending on a user-focused object and a user's knowledge level.

The document summarization apparatus according to the present invention comprises as components in principle a focused information relevant portion extraction unit and a summary generation unit. According to the user-focused information and the author-focused information, the focused information relevant extraction unit extracts a portion related to these two types of information from a document to be summarized. User-focused information refers to information focused by a user who uses the summary of a document to be summarized. Author-focused information refers to information which an author urges a user to pay an attention to.

The summary generation unit generates a summary of a document to be summarized based on an extraction result from the focused information relevant portion extraction unit.

The document summarization apparatus according to the present invention can also be designed to include a summary readability improvement unit and a summary generation unit as components in principle. According to user known information and information known through an access log, the summary readability improvement unit distinguishes these two types of information from other information and improves the readability of a summary by selecting an important portion of a document to be summarized. User known information refers to information already known to a user in a document to be summarized. Information known through an access log refers to information regarded as having been already known by a user based on a document previously presented to the user.

The summary generation unit generates a summary of a document to be summarized using an important portion of the document to be summarized selected by the summary readability improvement unit.

The document summarization apparatus of the present invention can further be designed to include a focused information relevant portion extraction unit and a summary readability improvement unit in addition to a summary generation unit. In this case, the summary readability improvement unit selects an important portion of the document to be summarized as described above corresponding to the extraction result from the focused information relevant portion extraction unit, and the summary generation unit generates the summary of the document to be summarized based on the selection result of the summary readability improvement unit.

In the document summarizing method according to the present invention, a portion related to focused information is extracted as a central portion of a summary based on two types of focused information, for example, the user-focused information and the author-focused information. In this case, the focused information criteria determines that a portion containing more focused information is more important.

By weighing either of the two types of the above described focused information, a summary can be generated with any appropriate contents from a summary focused on the user-focused information to a summary focused on a document only.

The document summarizing method according to the present invention, unlike the above described method, can be designed to generate a summary according to two types of known information, that is, the user known information and the information known through an access log. This indicates that the summary is generated according to the knowledge level of a user to improve the readability of the summary based on the user's knowledge criteria.

The user's knowledge criteria implies two criteria: a concept knowledge criterion (or standard) and a proposition knowledge criterion. A concept knowledge criterion refers to, for example, a criterion that a word (typically a noun) output in a summary should be known to a user. A proposition knowledge criterion refers to, for example, a criterion relating to a combination of words found in a document that a proposition (fact) described in combinations of words is included in a summary in order from a proposition a user knows the least.

In the document summarizing method according to the present invention, a summary can also be generated according to both focused information criteria and user's knowledge criteria. Thus, a summary can be generated including both the user-focused information and the contents the author intended to write. The summary can further be generated according to a knowledge level of a user.

BRIEF DESCRIPTION OF THE DRAWINGS

FIG. 1 shows the first principle of the present invention;

FIG. 8 is a flowchart showing the process of the document structure analyzer in step S7 shown in FIG. 4;

FIG. 10 shows a candidate for a word in Japanese;

FIG. 11 shows a candidate for a word in English;

FIG. 14 shows an example of a result of a syntax discourse analysis;

FIG. 15 shows an example of a representation of disposition information using a case frame;

FIG. 16 shows an example of a representation of proposition information through a meaning network;

FIGS. 17A and 17B show an example of discourse analysis of a predicate phrase;

FIG. 20 shows the process of computing the amount of new information;

FIG. 22 shows an example of a result of the summary of the abstract of a patent;

FIGS. 23A and 23B show an example of a summary explaining the effect of the concept knowledge criterion of a topic phrase;

FIG. 24 shows a result of the first computation of the amount of information for obtaining FIG. 23A;

FIG. 25 shows the amount of information after a sentence 72 has been selected in the process shown in FIG. 24;

FIG. 26 shows the setting of dependence to obtain a result of the process shown in FIG. 23;

FIG. 27 shows a result of the computation of the amount of information with the dependence shown in FIG. 26 taken into account;

FIG. 28 shows the amount of information after a sentence 11 has been selected in the process shown in FIG. 27;

FIG. 29 shows the algorithm of extracting the digest information as another embodiment of a sentence selecting system;

FIG. 30 shows the correspondence of words between the algorithm shown in FIG. 29 and the flowchart shown in FIG. 19.

DESCRIPTION OF THE PREFERRED EMBODIMENTS

Figure 2:
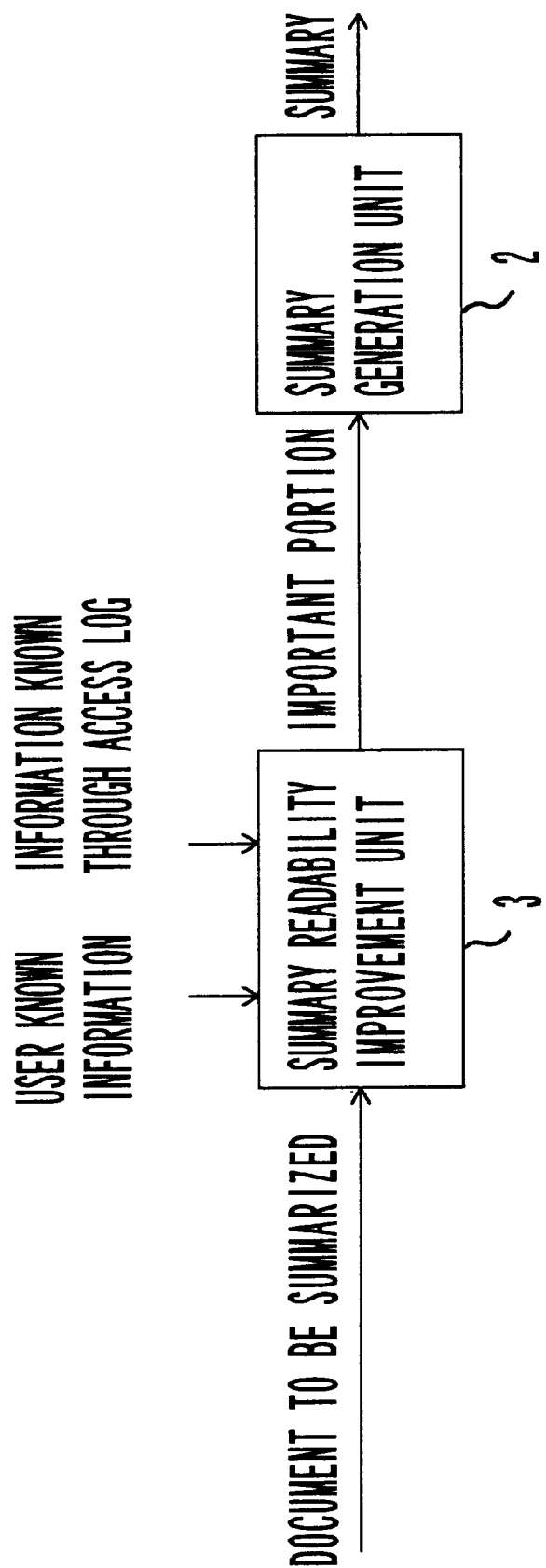
FIG. 2 shows the second principle of the present invention.

FIGS. 1 and 2 show the principle of the present invention. That is, these figures show the principle of the document summarization apparatus for summarizing a document to support the selection, access, edition, and management of a document written in a natural language and electrically stored.

FIG. 1 shows the first principle of the present invention. In FIG. 1, according to user-focused information and author-focused information, a focused information relevant portion extraction unit 1 extracts a portion related to the information from a document to be summarized. User-focused information refers to information focused by a user who uses a summary of the document. Author-focused information refers to information on which the author requests the user to focus his or her attention. A summary generation unit 2 generates a summary of the document to be summarized based on the extraction result of the focused information relevant portion extraction unit 1.

FIG. 2 shows the second principle of the present invention. In FIG. 2, according to user known information and information known through an access log, a summary readability improvement unit 3 selects an important portion in the document to be summarized using the two types of known information as being distinguished from other information to improve the readability of the summary. The user known information refers to information known to the user who uses the summary. The information known through an access log refers to information regarded as being known to the user based on the document previously presented to the user. A summary generation unit 4 generates a summary of the document to be summarized based on the selection result of the summary readability improvement unit 3.

According to the embodiment of the present invention, a summary is generated based on both of the two principles shown in FIGS. 1 and 2. In FIG. 1, a portion relevant to focused information is extracted as a center of the summary according to two types of focused information, that is, the user-focused information and author-focused information. In this embodiment, the center of the summary is determined based on a focused information criteria that a portion containing a larger volume of focused information is more important.

A summary can be generated with both user-requested information and important information in the document, that is, the information about the contents that the author intended to write. By weighing any of the two types of focused information, a summary can be generated to the purpose from a user-focused-information summary to an author-focused-information summary. Otherwise, equally based on these two types of focused information, the user-requested information and the contents the author intended to write can be appropriately extracted to generate a desired summary.

In FIG. 2, a summary is generated based on the two types of information, that is, the user known information and the information known through an access log. This indicates that the summary is generated according to the user's knowledge level, and that the readability of the summary can be improved. The user's knowledge criteria is used to improve the readability. The user's knowledge criteria refers to, for example, the concept knowledge criterion and the proposition knowledge criterion.

The concept knowledge criterion indicates that an element concept composing a summary, particularly an element concept relating to a topic of a sentence, should be known. An element concept refers to a concept represented by a word appearing in a summary. In other words, a word (mainly a noun) output in a summary should be understandable for the user. Based on the criterion, the present invention supplements a plurality of parts of a document related to a word unfamiliar to the user.

The proposition knowledge criterion (or standard) relates to a combination of words appearing in a document, and indicates that as many unknown word combinations (propositions) as possible should be taken into a summary if the amount of focused information and the size of a summary is same. Based on the criterion, the present invention reduces redundant information in a summary of a document in such a manner not to select two or more sentences corresponding to a same proposition. It also reduces redundant information in a summary of a series of documents, such as a series of newspaper articles reporting a same event, in such a manner not to select two or more sentences relating to a same aspect of the event.

The proposition knowledge criterion indicates weaker restrictions than concept knowledge criterion. Whereas the concept knowledge criterion requests to select sentences in the condition that they contain as few unknown concepts as possible, the proposition knowledge criterion requests to select a sentence that contains more new information (i.e., propositions the user does not know) only when there are two or more sentences of a nearly equal amount of focused information.

Thus, according to the present invention, a summary is generated based on the two kinds of criteria, the focused information criteria and the user's knowledge criteria.

Figure 3:
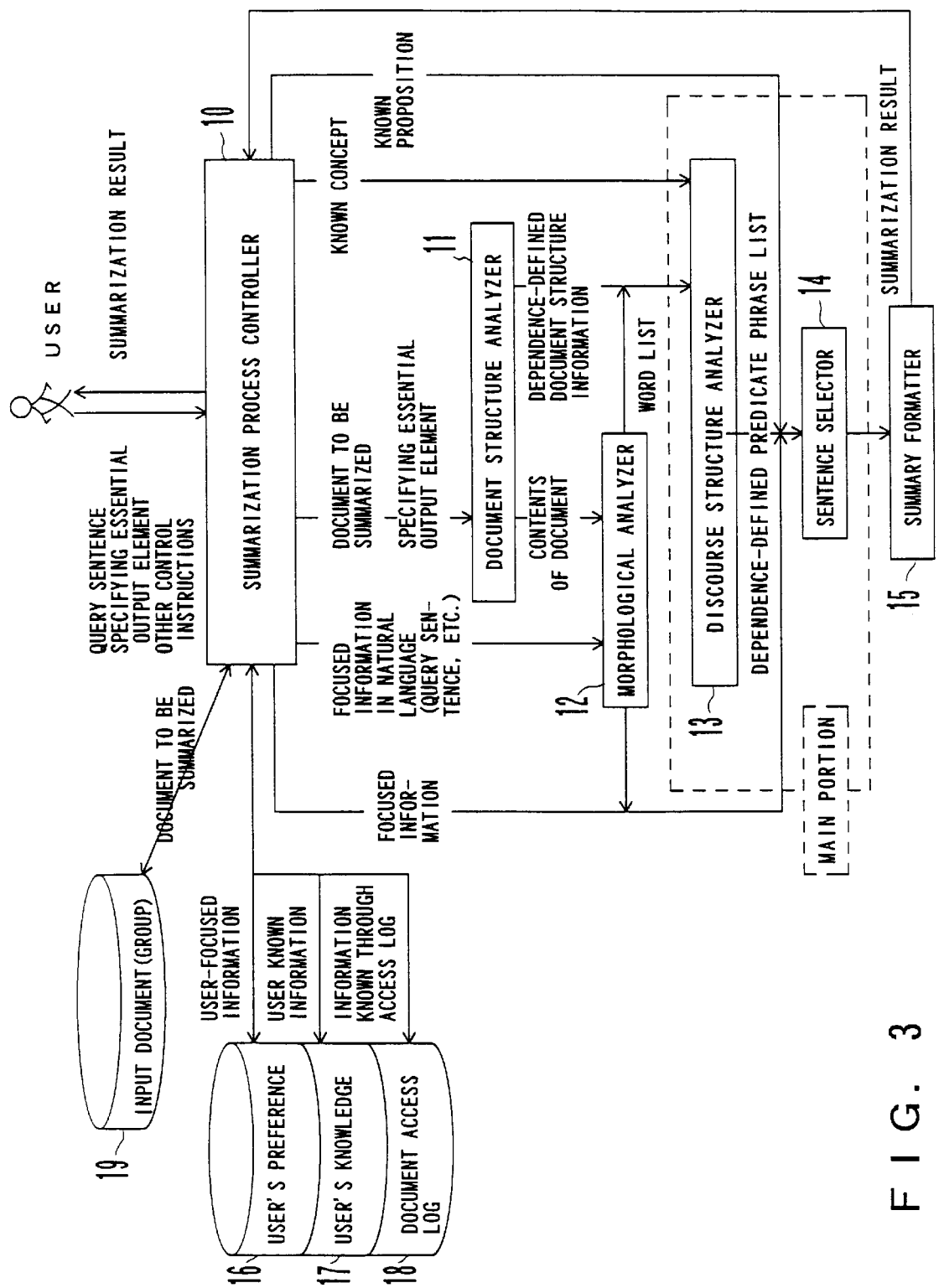
FIG. 3 is a block diagram showing the configuration of the document summarization apparatus according to the present invention.

FIG. 3 is a block diagram showing the configuration of the document summarization apparatus according to the present invention. In FIG. 3, the document summarization apparatus comprises as basic components a summarization process controller 10; a document structure analyzer 11; a morphological analyzer 12; a discourse structure analyzer 13; a sentence selector 14; and a summary formatter 15. Among these components, the components specific to the present invention are the discourse structure analyzer 13 and the sentence selector 14. In FIG. 3, the memory of the document summarization apparatus stores a user's preference 16, a user's knowledge 17, and a document access log 18 as user profile information. An input document (group) 19 is stored in another memory.

The processes performed by the most specific components according to the present invention, that is, the discourse structure analyzer 13 and the sentence selector 14, are described in detail later in and after FIG. 13. Described below are the processes of other components by referring to FIGS. 4 through 12.

The summarization process controller 10 functions as interface between a user and the document summarization apparatus, and controls the entire operation of the document summarization apparatus. As an interface with a user, the summarization process controller 10 receives the information focused on by the user, that is, the user-focused information, and an input such as a request in generating a summary, appropriately activates a process of summarizing a document, and outputs a resultant summary to the user. A typical form of user-focused information is a query sentence input from the user, and can be keywords relating to requested information or an introduction sentence appearing in a guide for books.

As for a request in generating a summary, that is, restriction information relating to generation of a summary, a required output element and other control instructions are specified by the user. A required output element refers to an element to be included in a summary. Other control instructions specify information to be used as focused information and known information, how to use the information, a desired length of summary and basic unit a summary is composed of. The basic unit can normally be a sentence or a predicate phrase.

When the document summarization apparatus is used to support the comparison among a plurality of documents, the summarization process controller 10 controls the operation of each process unit and stores the process history. First, it extracts author-focused information of documents to be compared by analyzing their structure and contents. Then, it performs subsequent summary processes (the discourse structure analyzing process, the sentence selecting process, and summary formatting process) based on the merged focused information.

Figure 4:
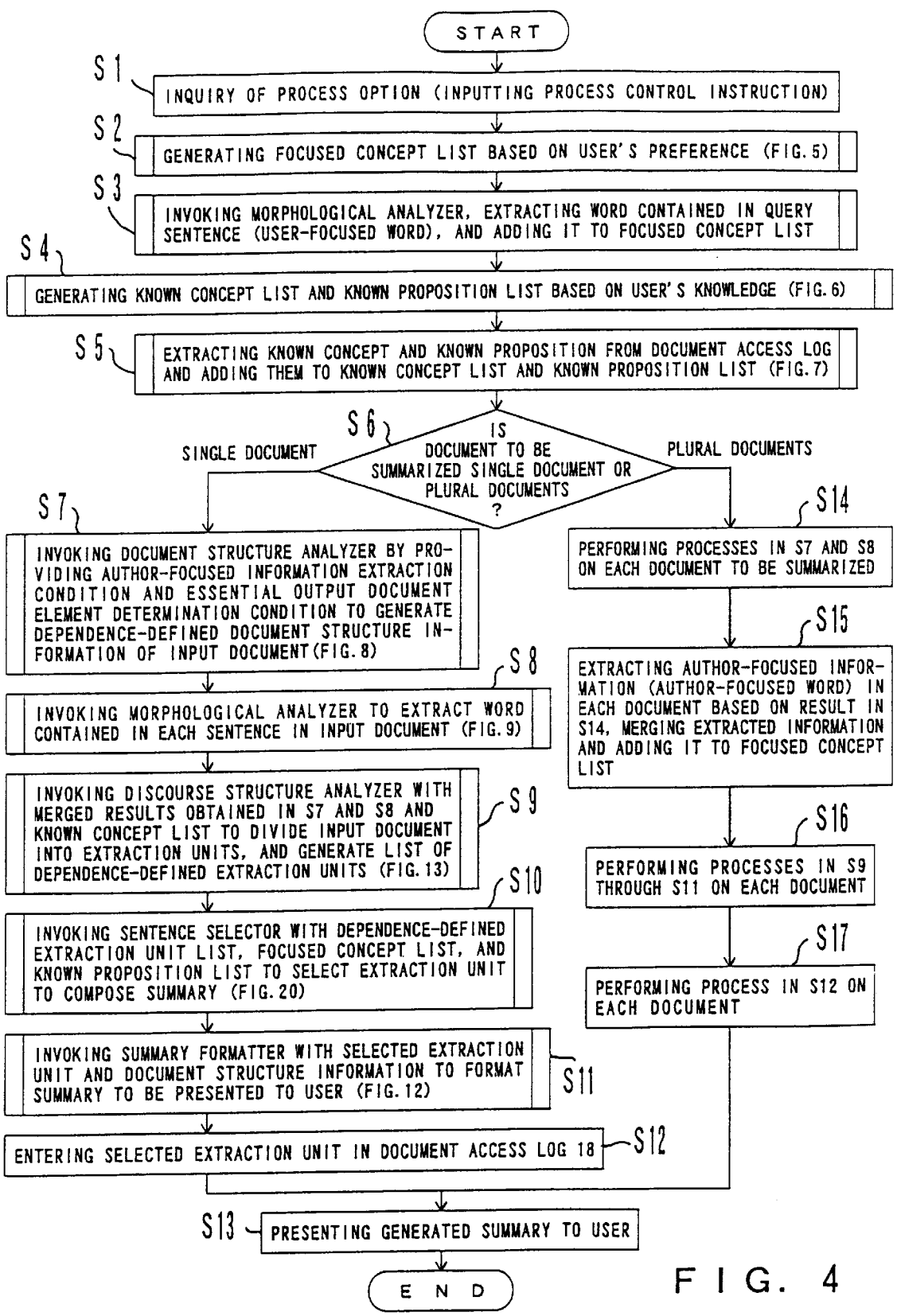
FIG. 4 is a detailed flowchart showing the summary process.

FIG. 4 is a flowchart showing the process performed by the summarization process controller 10. When the process starts as shown in FIG. 4, a process control instruction can be input as an inquiry for a process option in step S1. The control instruction can be a query sentence input by a user as shown in FIG. 3, designation of a required output element, and can be other control instructions.

Among them, the query sentence is a typical form of the user-focused information as described above. Other control instructions include the restriction information relating to the generation of a summary as follows: extraction conditions of the focused and known information, determination conditions of essential output elements, and so forth.

The extraction conditions of the focused and known information comprises determination conditions indicating the types of document elements from which author-focused information are extracted and process options specifying whether or not user profile information (user's preference, user's knowledge, and a document access log) is used. The determination conditions of essential output elements specify the source from which the author-focused information is extracted, and comprises as follows: a list of the types of logical element of a document chapters, sections, headers of tables and figures, contents, item names of indices of terms and propositions.

The summarization process controller 10 extracts user-focused information in steps S2 and S3 based on an input from the user, and extracts known information in steps S4 and S5. The process of extracting the author-focused information is performed in the sentence selecting process by a sentence selector described later, that is, the process performed in step S120 shown in FIG. 19. In this process, the author-focused information is extracted from a document element that meets the determination conditions on the source from which the author-focused information is extracted.

In step S2, a focused concept list is generated as user-focused information. For example, the focused concept list is generated based on the user's preference 16 stored in the memory. In this step, at a request from a user, a focused concept list is also extracted from another user's preference 16, which is stored in the memory mainly for a guest user who does not have his or her own profile information (users's preference feature, user's knowledge, and document access log). The guest user can select a profile information model closest to his/her preference and knowledge from among the models preliminarily prepared by the system. The reason why the word 'focused concept list' is used instead of the 'focused information list' or 'focused word list' is described later.

In step S3, the morphological analyzer 12 is invoked, and a word appearing in the query sentence input by the user, that is, a user-focused word, is extracted and added to the focused concept list. A typical focused concept list is a noun list as described later.

In steps S4 and S5, known information is extracted as a known concept list, that is, a list of concepts known to the user, and as a known proposition list, that is, a list of proposition (facts, attribute of something, etc.) known to the user. In step S4, a known concept list and a known proposition list are generated from the user's knowledge 17 stored in the memory. This process is described later further in detail by referring to FIG. 6.

In step S5, a known concept and a known proposition are extracted from the document access log 18 stored in the memory. This process is described later further in detail by referring to FIG. 7. In steps S4 and S5, as in step S2, another user's profile information can be used.

A known concept and a known proposition are further described below. A known concept refers to a list of contents words, each word having a substantial meaning. For example, if a user knows what business Fujitsu is engaged in, the user is assigned 'Fujitsu' as a known concept. If the document to be summarized begins with 'Fujitsu is a Japanese computer manufacturer, and Fujitsu is planning to . . . ', the first sentence is included in a summary because the start of the second sentence 'Fujitsu' implies an anaphoric expression. However, since the computer can easily determine that Fujitsu is a known concept and the first sentence only introduces the name of the company (definition of an attribute), the first sentence is not extracted according to the present embodiment.

However, if such a simple method is followed, there may be a trouble when the following document is processed.

'Fujitsu is originally a manufacturer of a switching unit. It now ranks second in the field of a large-scale computer, and many people know Fujitsu as a personal computer manufacturer. Although a number of people may wonder about the relationship between NTT and Fujitsu, they are close to each other.'

For example, when a user only knows Fujitsu as a personal computer manufacturer, the first sentence should be included in the summary when the third sentence is included therein. To avoid this, it is necessary to specify that what does the user know about Fujitsu. For example, 'Fujitsu is a Japanese computer manufacturer,' 'Fujitsu manufactures personal computers,' etc. should be announced. Furthermore, a user may know that 'Fujitsu manufactured switching units in the past', but may not know that 'Fujitsu has been manufactured switching units' or 'Fujitsu plans to keep manufacturing switching units'. Thus, this means that the knowledge of propositions is processed in the present embodiment.

Thus, a list of technical terms is provided as a known concept according to the present embodiment. A technical term refers to a technical concept, and can be easily determined to be known or unknown as long as the field of application is limited. The above described simple sentence or an expression corresponding to the contents of the simple sentence is represented in various forms such as a frame representation as the knowledge relating to a known proposition.

Since a known concept is used in determining whether or not a complementary or explanatory description is required, the known concept is provided for the discourse structure analyzer 13. That is, when a portion is included in a summary, the discourse structure analyzer 13 determines whether or not other portions explaining the previous portion should be included. The determination depends on whether or not a word is a known concept.

In FIG. 4, the summarization process controller 10 performs the processes up to the extraction of the user-focused information and known information in steps up to S5, and then, in and after steps S6, analyzes an input document, and generates a summary. These processes depend on whether a single document is summarized or a plurality of documents are collectively summarized. In either case, the process is based on summarizing a single document.

When a summary of a single document is generated, the document structure analyzer 11 is invoked in step S7, the extraction conditions on author-focused information and the determination conditions on required output document elements are provided, and a dependence-defined document structure information of an input document is generated. This process is explained in detail by referring to FIG. 8.

Then, in step S8, the morphological analyzer 12 is invoked, and a list of words included in the input document is obtained. These processes are described in detail by referring to FIG. 9.

Figure 5:
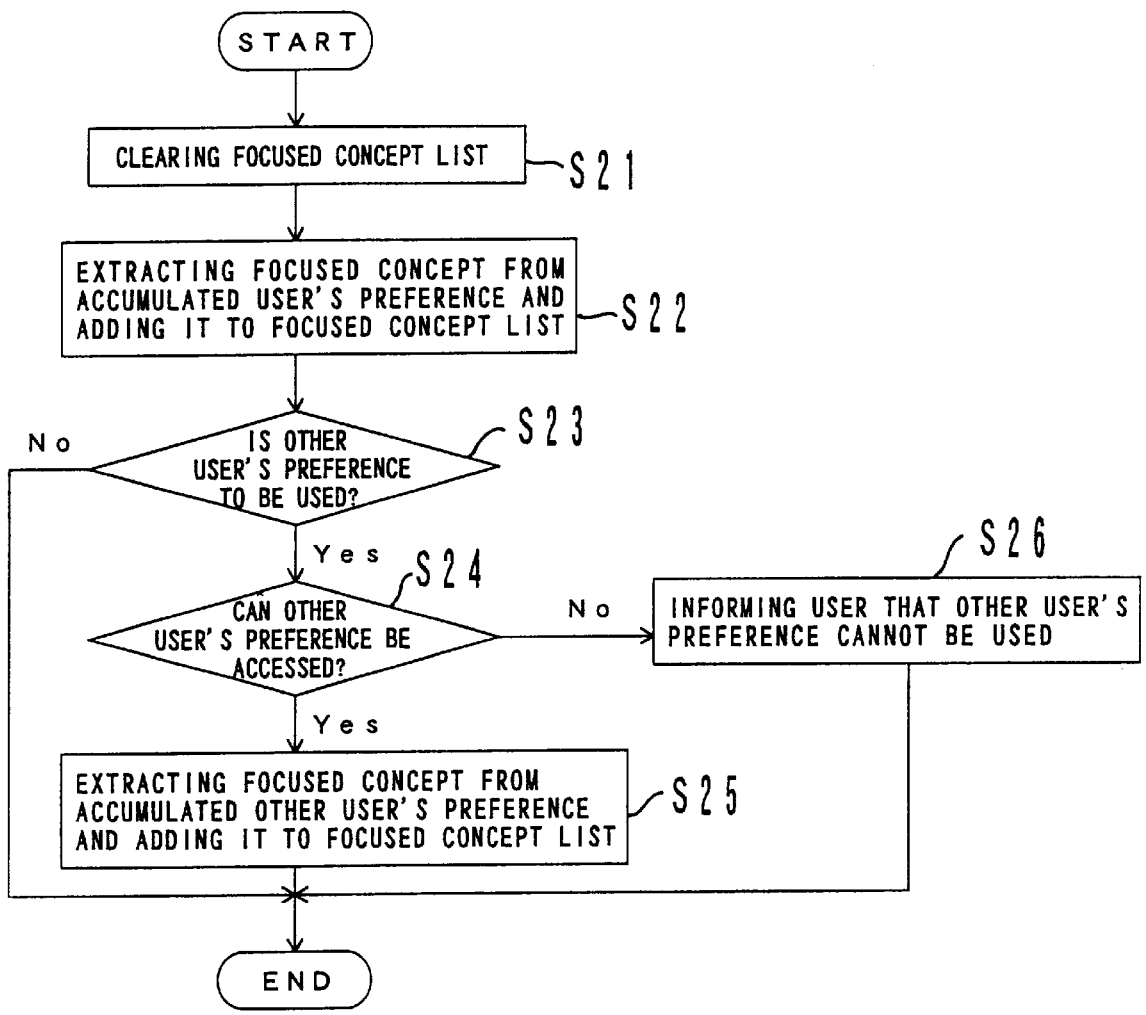
FIG. 5 is a flowchart showing the process of generating a focused concept list in step S2 shown in FIG. 4.

Next, in step S9, the document structure information obtained in step S7, the word list obtained in step S8, and the known concept list obtained in steps S4 and S5 in FIG. 5 are provided for the discourse structure analyzer 13. The discourse structure analyzer 13 divides an input document into extraction units (typically predicates), sets dependence, that is, sets restrictions satisfying a concept knowledge criterion as the dependence among the extraction units.

In step S10, the list of the dependence-defined extraction units obtained in step S9, the obtained focused concept list, and the known proposition list are provided for the sentence selector 14. The sentence selector 14 selects the extraction units to be included in a summary. In step S11, the selected extraction units and the document structure information to the summary formatter 15. The summary formatter 15 generates a summary to be displayed for the user.

When a plurality of documents are collectively summarized, the processes in steps S7 and S8 are performed on each document in step S14, that is, document structure information and a word list are generated. In step S15, author-focused information (author-focused words) is extracted from each document, and merged and added to the focused concept list. When the author-focused information is extracted, a document element specified as an extraction source of the author-focused information in step S1 is compared with the document structure information and a noun contained therein is selected as, for example, a focused concept. In step S16, a list of extraction units is generated in step S9, an extraction unit is selected in step S10, and a summary is generated in step S11. Then, a summary of each document is generated.

After generating the summary in step S11 or S16, the summarization process controller 10 enters in the document access log 18 an extraction unit list contained in the portion presented to the user as a summary in step S12 or S17, then in step S13, the generated summary is presented to the user, thereby terminating the process.

Then, an important process shown in FIG. 4 is described by referring to FIGS. 5 through 12. FIG. 5 is a flowchart showing the process in step S2 shown in FIG. 4, that is, the process of generating a focused concept list.

When the process starts as shown in FIG. 5, a focused concept list is cleared as initialization in step S21, and a focused concept is extracted from the user's preference 16 accumulated in the memory in step S22 and added to the focused concept list.

Then, it is determined in step S23 whether or not the preference 16 of another user is used. If it is not used, the process terminates immediately. If it is used, it is determined in step S24 whether or not the preference of the other user can be accessed. If it can be accessed, a focused concept is extracted from the accumulated preference 16 of the other user in step S25 and added to the focused concept list, thereby terminating the process. If it cannot be accessed, it is announced to the user in step S26 and the process terminates.

Figure 6:
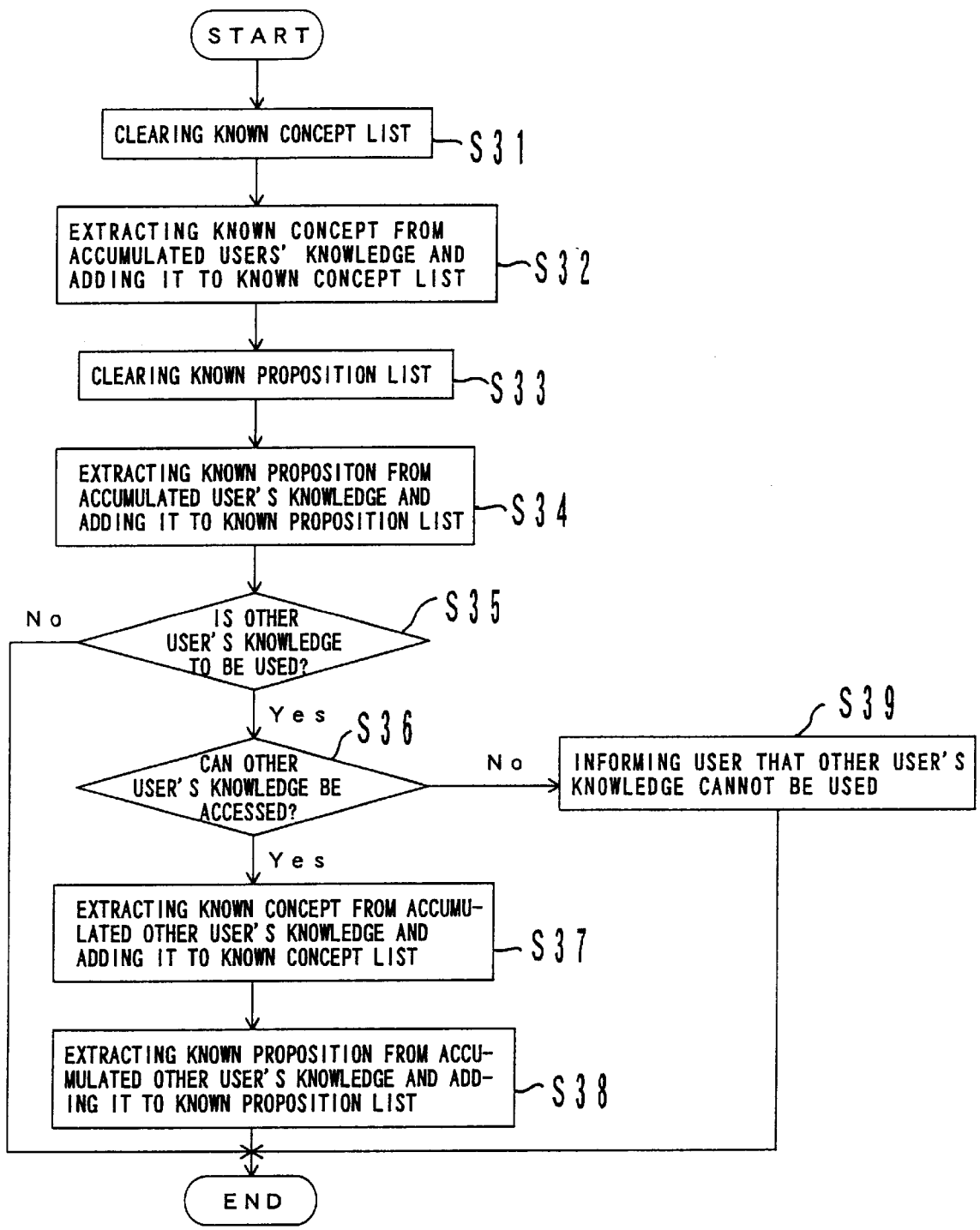
FIG. 6 is a flowchart showing the process of generating a known proposition list and a known concept list in step S4 shown in FIG. 4.

FIG. 6 is a flowchart showing the process in step S4 shown in FIG. 4, that is, the process of generating a known concept list and a known proposition list based on the user's knowledge 17. When the process starts as shown in FIG. 6, the contents of the known concept list are cleared as initialization in step S31, and the known concept is extracted from the user's knowledge 17 accumulated in the memory and is added to the known concept list in step S32.

Then, in step S33, the known proposition list is cleared as initialization, and a known proposition is extracted from the accumulated user's knowledge 17 and added to the known proposition list in step S34.

In step S35, it is determined whether or not the knowledge 17 of another user is used. If it is not used, the process terminates immediately. If it is used, it is determined in step S36 whether or not the knowledge 17 of the other user can be accessed if it can be accessed, a known concept is extracted from the accumulated knowledge of the other user and added to the known concept list in step S37, and a known proposition is extracted and added to the known proposition list in step S38, thereby terminating the process. If the knowledge 17 of the other user cannot be accessed in step S36, it is announced to the user in step S39, thereby terminating the process.

Figure 7:
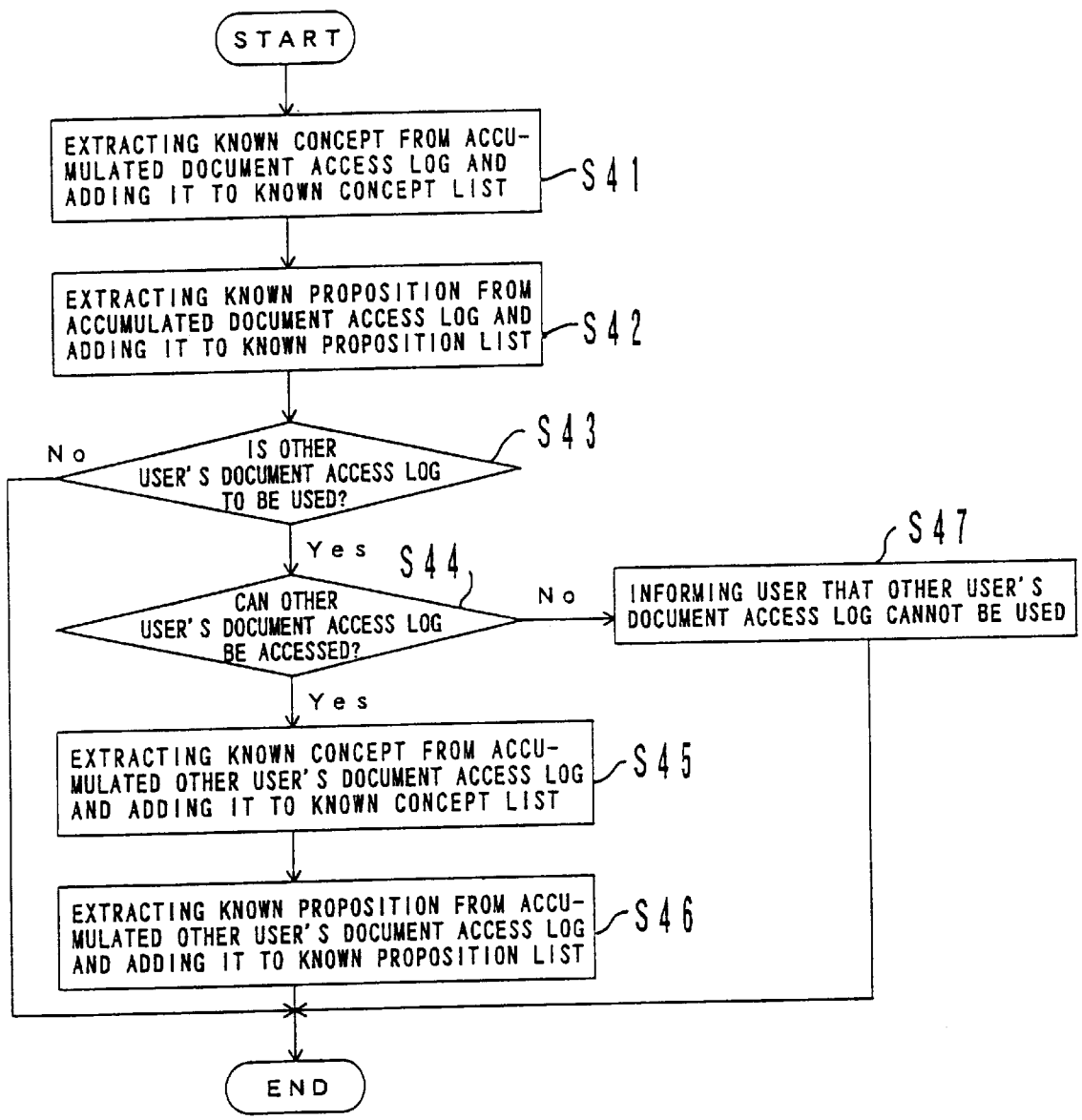
FIG. 7 is a flowchart showing the addition to a known concept list and a known proposition list in step S5 shown in FIG. 4.

FIG. 7 is a flowchart showing the process in step S5 shown in FIG. 4, that is, the process of adding from the document access log 18 to the known concept list and the known proposition list. The processes in FIGS. 6 and 7 are similar and only different in that the processes in steps S31 and S33 shown in FIG. 6 are not performed, that is, the known concept list and the known proposition list are not cleared, and that the known concept and the known proposition are extracted from the document access log 18 in the memory in FIG. 7. Therefore, the detailed explanation about the other processes in FIG. 7 are omitted here.

FIG. 8 is a flowchart showing the process in step S7 shown in FIG. 4, that is the process of generating a dependence-defined document structure information by the document structure analyzer. The document structure analyzer 11 receives a document to be summarized, determination conditions of document elements from which the author-focused information is extracted, and the determination conditions of required output elements from the summarization process controller 10. Then, the document structure analyzer 11 analyzes the structure of the document, outputs the contents of the document to the morphological analyzer 12, and provides the dependence-defined document structure information for the discourse structure analyzer 13.

When the process starts as shown in FIG. 8, a logical component of a document such as a header, a body of the document, etc. is recognized from the format of the document, markup information in recognizing the logical structure of the input document in step S51. The practical process depends on the type of document, that is, whether a document is a plain text or is a structured document marked up with SGML or the like, and is not essential to the present invention. Therefore, the detailed explanation about the process is omitted here.

In step S52, the leading element of the document is retrieved. In step S53, it is determined whether or not the document element has been successfully retrieved. If yes, it is determined in step S54 whether or not the retrieved document element satisfies the extraction conditions of the focused information. If it satisfies the extraction conditions of the author-focused information, then the document element is assigned a mark of focused information in step S55, and control is passed to the process in step S56. Unless the extraction conditions are satisfied in step S54, control is immediately passed to the process in step S56.

In step S56, it is determined whether or not the retrieved document element satisfies the extraction conditions on an essential output element. If yes, the document element is assigned a mark of an essential output in step S57. If not, the process in step S57 is not performed. Then, control is passed to the process in step S58.

In step S58, it is determined whether or not the document element is a header, an element corresponding to a header, or the like, including a header of a section and an item name of a list item. If yes, a document element in the body corresponding to the header element is obtained and set the dependence on the header element in step S59. If the document element is not a header, then the process in step S59 is not performed. Then, in step S60, the next document element is retrieved and the processes in and after step S53 are repeated. When it is determined in step S53 that no document elements can be retrieved, the process terminates.

As a result of setting the dependence in step S59, a header marked here will be extracted into a summary if its dependent element, that is, a element in its corresponding body part, extracts into a summary.

Figure 9:
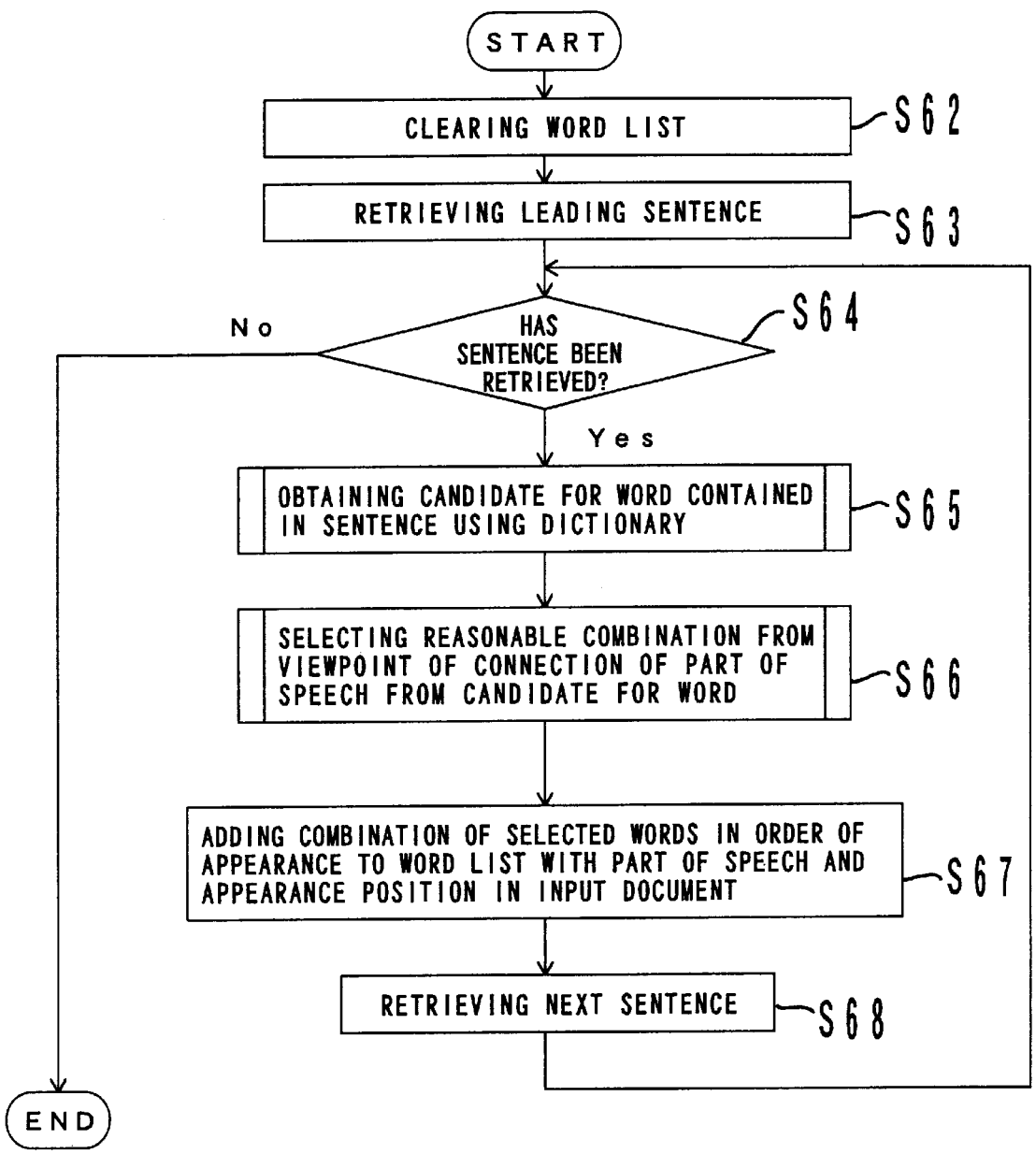
FIG. 9 is a flowchart showing the process of morphological analysis in step S8 shown in FIG. 4.

FIG. 9 is a flowchart showing the morphological analyzing process performed by the morphological analyzer 12. The morphological analyzer 12 receives the contents of a document to be summarized in step S8 shown in FIG. 4, recognizes a word contained in the contents, and outputs the contents of the document to the discourse structure analyzer 13 in the form of a word list with information about the appearance position of a word and its part of speech. When the user-focused information is provided as a query sentence in a natural language, a word list is similarly generated from the user-focused information in a natural language in step S3.

When the process starts as shown in FIG. 9, the contents of the word list is cleared as initialization in step S62, and the leading sentence is retrieved in step S63. In this process, a sentence is retrieved from the beginning using a period, etc. as a clue. It is determined in step S64 whether or not the sentence has been successfully retrieved. If yes, a candidate for a word contained in the sentence is obtained using a dictionary in step S65.

FIG. 10 shows the candidate for a Japanese word. Since words are not clearly delimited in Japanese, all words forming a character string in a sentence can be candidates.

FIG. 11 shows a candidate for an English word. Since words are normally delimited by a space, a part of speech or each candidate is obtained in the process.

In step S66 shown in FIG. 9, an appropriate sequence of words are selected from the viewpoint of the connection of parts of speech. In step S67, parts of speech and the appearance positions in the input document are assigned corresponding to the selected sequence of words, and the words are added to the word list. In step S68, the subsequent sentence is retrieved and the processes in and after step S64 are repeated. In step S64, the process terminates when it is determined that no sentences have been retrieved.

The information about the appearance position assigned in step S67 in the input document associates the dependence-defined document structure information output from the document structure analyzer 11 with the contents of the word list, and is represented by an offset value with the position of the leading character of a word in a document, that is, the start of a document, set to 0.

Various practical methods for steps S65 and S66 can be adopted as morphological analyzing methods such as an example in the following document 9, and the detailed explanation is omitted here. For example, the method of evaluating the validity of a sequence of words based on the occurrence probability estimated using training data is described in the above described document 6 and the following document 9.

Document 9: Masaaki Nagata. A stochastic Japanese morphological analyzer using a forward-DP backward-A* N-best search algorithm. In Proceedings of COLING '94, pp. 201–207, 1994.

Document 10: Eugene Charniak. Hidden markov models and two applications. In Statistical Language Learning, chapter 3, pp. 37–73. The MIT Press, 1993.

The discourse structure analyzer 13 performs the discourse structure analyzing process described later using document structure information, a word list, and a known concept list in step S9 shown in FIG. 4, and outputs an extraction unit list dependence-defined with restrictions satisfying the knowledge standard of concepts on the sentence selector 14.

The sentence selector 14 selects a unit to be extracted in a summary from the extraction unit list output from the discourse structure analyzer 13 according to the focused concept list and the known proposition list in step S10 shown in FIG. 4, and generates a selection result list described later.

Then, focused information such as a query sentence in a natural language is provided for the morphological analyzer 12, and other focused information is directly provided for the sentence selector 14 without the morphological analyzer 12. According to the present embodiment, the amount of focused information indicating the importance of a sentence is, as described later, computed in word units, for example, in nouns. When the focused information is given as a sentence written in a natural language, the sentence should be divided into words. To attain this, a header retrieved from a question sentence, a document, etc. is passed to the sentence selector 14 through the morphological analyzer 12.

On the other hand, the user-focused information accumulated as, for example, the user's preference 16 can be stored in the memory in an appropriate form after performing a morphological analysis. In this case, the information can be directly provided for the sentence selector 14 without the morphological analyzer 12. Although information not related to a natural language is not used in the present embodiment, the storage format in the memory can be a meaning network representation described later, or can be a frame representation. The accumulated information is not limited to a simple natural language.

A noun list is typically provided as focused information used by the sentence selector 14. A strongly-focused noun can be assigned a weight corresponding to the focus level. An independent word (a verb, an adjective, etc.) other than a noun can be provided as focused information, or as a set of a noun and a verb. In the following explanation, a noun list without weight is given as focused information. An extraction unit (basically a clause for English document) is selected according to the dependence of extraction units based on the concept knowledge criterion, which was set in the process performed by the discourse structure analyzer 13 as well as focused information criteria and proposition knowledge criterion. Therefore, the selection result list is generated as applied to the concept knowledge criterion.

The summary formatter 15 arranges the extraction units selected by the sentence selector 14 in the order they appear in the original document, and rearranges the summary in a readable format by adding a mark indicating the existence of a sentence not extracted and by inserting a delimitation of paragraphs. If the dependence on the information known through an access log is set, a hyper-textual correlation can be set.

Figure 12:
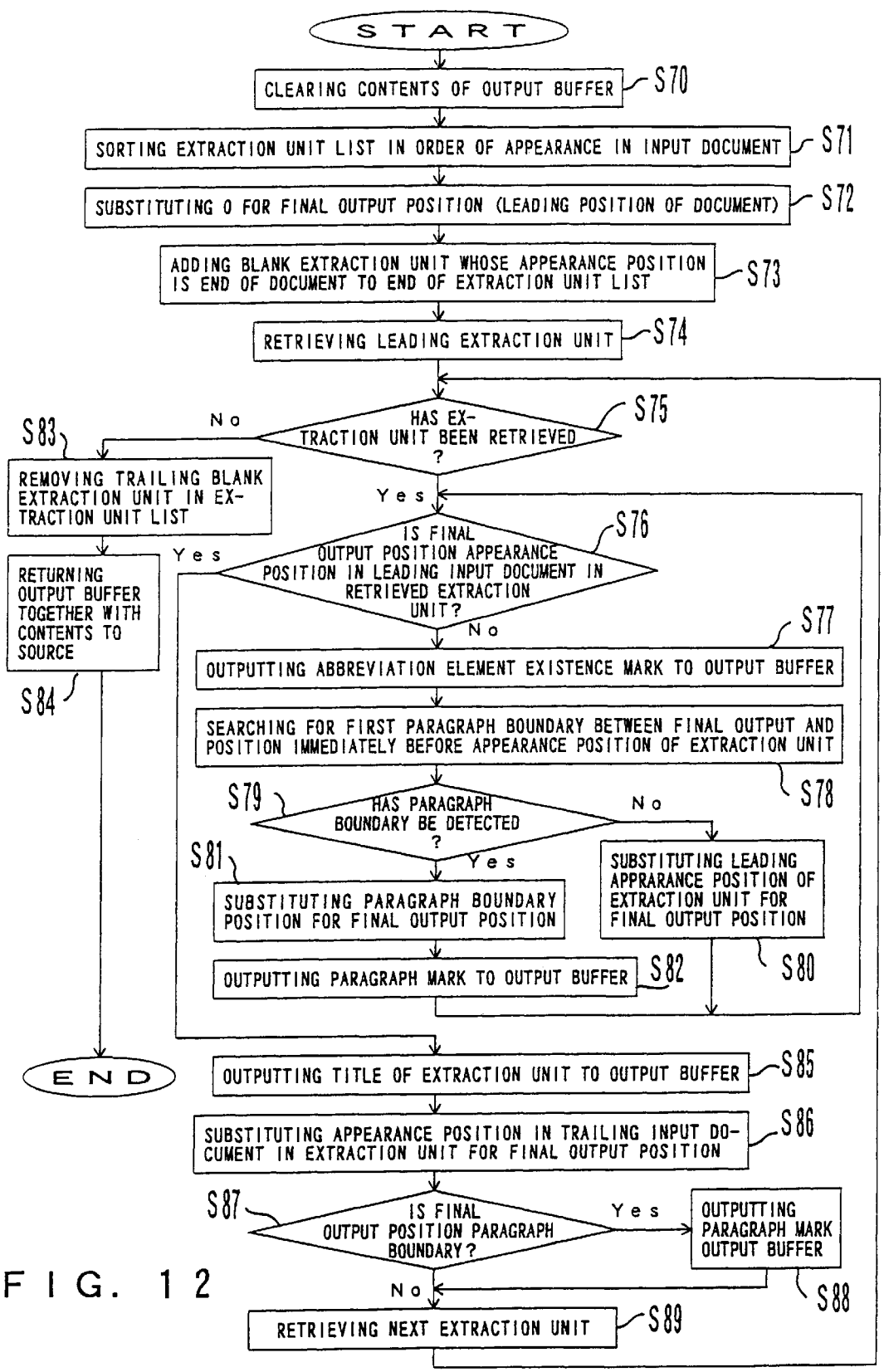
FIG. 12 is a flowchart showing the process of formatting a summary in step S11 shown in FIG. 4.

FIG. 12 is a flowchart showing the process performed by the summary formatter. When the process starts as shown in FIG. 12, the contents of an output buffer are cleared in step S70. The output buffer is reserved by, for example, the summarization process controller 10 which invokes the process and passed to the summary formatter 15 as described in step S11 in the process flow of the summarization process controller 10 shown in FIG. 4. The summary formatter 15 can also reserve such a buffer locally.

Then, in step S71, the data in an extraction unit list is sorted in order in which they appear in an input document. In step S72, the starting position (0) of the document is substituted for the last output position. In step S73, a blank extraction unit is added to the end of the extraction unit as a trailer of the extraction unit list. In step S74, the leading extraction unit is retrieved.

It is determined in step S75 whether or not an extraction unit has been retrieved. Since it is naturally determined that it has been retrieved, it is further determined in step S76 whether or not the appearance position of the retrieved extraction unit in the leading input document matches the last output position. Since the last output position is the starting position of the document in step S72, there should be a non-extracted sentence between the starting position and the retrieved leading extraction unit if it is determined that the starting position of the extraction unit does not match the last output position. Therefore, an omission element existence mark is output to the output buffer in step S77. The omission element existence mark normally corresponds to ' . . . '. However, since the mark is also used when a part of a sentence has not been extracted, it usually refers to an existence of a non-extracted element (extraction unit).

In step S78, the last output position, that is, the first paragraph boundary between the starting position of the document to the position immediately before the appearance position of the extraction unit, is searched for. In step S79, it is determined whether or not a paragraph boundary has been detected. Unless a paragraph boundary has been detected, the first appearance position of the retrieved extraction unit is substituted for the last output position in step S80, and the processes in and after step S76 are repeated.

If a paragraph boundary has been detected in step S79, the position of the detected paragraph boundary is substituted for the last output position in step S81, and the processes in and after step S76 are performed after a paragraph mark is output to the output buffer in step S82.

In this example, the processes in steps S81 and S82 are performed and a paragraph mark is output to the output buffer when a paragraph boundary is detected between the starting position of the document and the position immediately before the appearance position of the retrieved extraction unit. In steps S76 through S82, after the processes in steps S81 and S82 are performed on all paragraph boundaries between the starting position of the document and the position immediately before the appearance position of the retrieved extraction unit, it is determined that no more paragraph boundaries are detected in step S79, the last output position approaches the first appearance position of the retrieved extraction units in step S80, it is determined in step S76 that the last output position matches the appearance position of the extraction unit, and the extraction unit is indicated to the output buffer in step S85.

The process performed by the summary formatter 15 is to generate a formatted summary as a character string, and the summary is returned as a character string to a source unit. The contents output to the output buffer in step S85 are the indicator of the extraction unit only, not the appearance position of the extraction unit.

After the last appearance position of the extraction units retrieved in step S75 is substituted for the last output position in step S86, it is determined in step S87 whether or not the last output position refers to a paragraph boundary. If yes, a paragraph mark is output to the output buffer in step S88. If not, no processes are performed. Then, in step S89, the next extraction unit is retrieved and the processes in and after step S75 are repeated.

If it is determined in step S75 that no extraction units can be retrieved, a trailing blank extraction unit is retrieved in step S83, and an output buffer is returned to the caller with the contents in step S84, thereby terminating the process.

Described below is the reason for adding a blank extraction unit with its appearance position set at the end of the document in step S73 and removing the unit in step S83. Thus, the paragraph boundaries between the last extraction unit in the extraction unit list and the end of the document can be output.

A paragraph boundary is output in step S82 or S88. If there is no extraction unit having its appearance position at the end of the document, then the paragraph boundary between the position of the last extraction unit in the extraction unit list and the end of the document cannot be output because it is determined in step S75 that no extraction units can be retrieved and the process terminates.

Therefore, in step S73, all paragraph boundaries up to the end of the document are output by adding a blank extraction unit with its appearance position set at the end of the document in step S73 and removing the unit in step S83. The description of the added extraction unit is blank and no character strings can be actually output to the summary.

The user's preference 16 stores the propositions in which users are interested. For example, explanatory sentences used in the self-introduction of a user, a document in which a user is interested, etc. are stored in the user's preference 16. It also can store keywords frequently appearing in such a document, the keywords and question sentences often used in retrieval by a user, etc.

The user's knowledge 17 stores information well known by users as user known information. For example, it stores a list of technical terms frequently used by the users.

The document access log 18 accumulates the history of user's access to documents and summaries.

The input document (group) 19 basically stores a document to be summarized, and normally can be generated as any type of electronic document. Practically, the SGML (ISO8879) which is the document structure description language used in electronic publishing, etc. can be adopted. The author-focused information specified after the generation of a document can be accumulated by an author or a manager of the document corresponding to the document to be summarized.

The user's preference 16, that is, user-focused information; the user's knowledge 17, that is, user known information; the document access log 18, that is, information known through an access log; and the input document (group) 19, that is, a document to be summarized, are the contents stored in the memory and managed by the summarization process controller 10 and used in generating a summary.

Described below are the discourse structure analyzer 13 and the sentence selector 14 which are characteristic components of the document summarization apparatus according to the present invention. FIG. 13 is a flowchart showing the details of the discourse structure analyzing process performed by the discourse structure analyzer 13.

Figure 13:
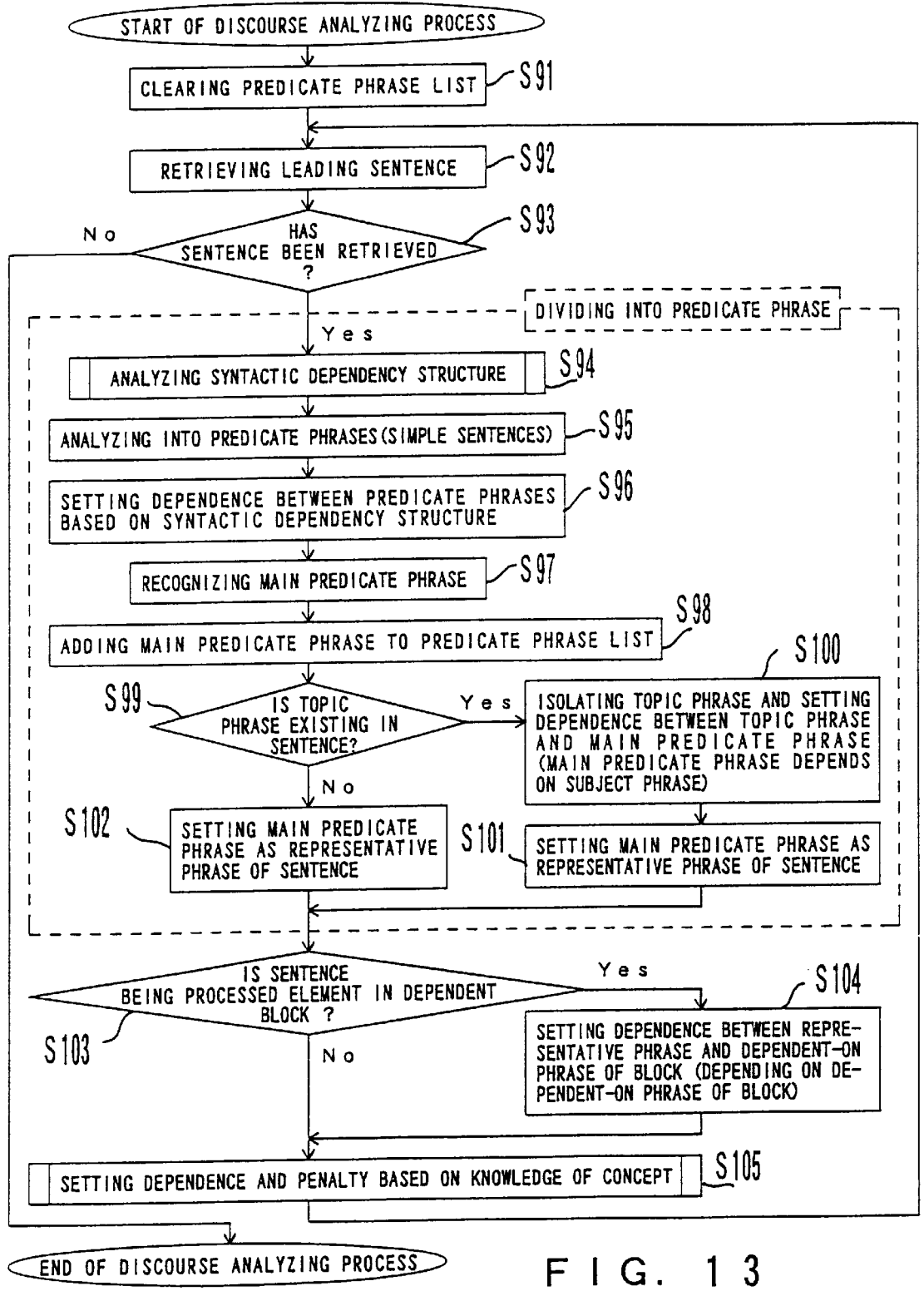
FIG. 13 is a flowchart showing the process of analyzing a discourse structure.

The discourse structure analyzing process is performed as shown in FIG. 13. The contents of a document converted by the morphological analyzer 12 into a word list are divided into extraction units to be processed by the sentence selector 14, and an extraction unit list having the divided extraction units as elements is generated. The selection restriction conditions of the extraction units to improve the readability of a summary are provided as the dependence among the extraction units according to the known concept list provided from the summarization process controller 10 and the document structure information output from the document structure analyzer 11. The restrictions to improve the readability of the summary comprise the restrictions based on the concept knowledge criterion and the restrictions based on the document structure in which a header is output corresponding to an extracted sentence.

Since the process of setting the dependence (step S96) among the extraction units in a sentence is inserted between the process of dividing a sentence into extraction units and the process of adding the extraction units to the predicate phrase list as a list of outputting the divided extraction units as shown FIG. 13, the sentence dividing process cannot be simply divided from the dependence setting process. The dividing process corresponds to the process of retrieving the leading sentence in step S92 and the process of dividing the sentence into predicate phrases encompassed by dotted lines (steps S94, S95, S97 through S100). The dependence setting process corresponds to steps S96, and steps S100 through S105.

According to the embodiment described below, a predicate phrase is used as an extraction unit in Japanese whereas a clause is used as an extraction unit in English. However, the word 'predicate phrase' is hereinafter used for both Japanese and English. (Both in Japanese and English, a sentence can be processed as extraction units as described later). A predicate phrase refers to a phrase based on one predicate and a dependent noun (including a subject), and corresponds to a simple sentence contained in a sentence. A predicate such as a word of declinable part of speech in Japanese and a verb in English is retrieved from a depending structure. Then, a dependent element excluding a predicate is added to the retrieved predicate to make a predicate phrase. A functional word, such as a conjunction, a preposition, an auxiliary, etc. is grouped with an independent word (contents word) immediately before or after the functional word. A modification element such as an adjective modifying a noun can be grouped with a modified element or can be expressed as an independent predicate phrase. However, an independent phrase should be determined depending on the wording characteristic of a modification element or the type of modification.

When the process starts as shown in FIG. 13, the contents of the predicate phrase list to be finally generated are cleared in step S91. In step S92, the leading sentence is retrieved. It is determined in step S93 whether or not the sentence has been detected. A sentence can be detected from a document using an end-of-sentence mark such as a period with the logical structure of the document taken into account by, for example, regarding a header as one sentence, etc.

If it is determined that a sentence has been detected, the structure of the syntax dependency of the sentence is analyzed in step S94. There are well-known methods of analyzing the structure of the syntactic dependency of a sentence using the dependency grammar, the phrase-structure grammar, etc. For example, the following document 10 refers to a basic method such as a chart method in which the structure of a document can be efficiently analyzed based on the context-free grammars.

Document 10: James Allen. Basic parsing techniques. In Natural Language Understanding, chapter 3, pp. 40–78. The Benjamin/Commings Publishing Company, Inc., 1987.

Described below is the analysis of the structure of the syntactic dependency by referring to FIG. 11. FIG. 14 shows an example of the analysis result. In FIG. 14, Lexicons indicates the correspondence between the word and the part of speech obtained in the morphological analysis (part of speech is expressed as abbreviated). The 'rewriting rules' indicates the grammatical rule used in analyzing the dependency structure. In the dependency structure analysis, the writing rules are sequentially applied to obtain a parsing tree having the S indicated by the output as a root. The simplest method is to apply the rule that each portion of the sequence of parts of speech 'NOUN VERB ART ADJ NOUN' corresponds to the right part ('ART ADJ NOUN' in rule 1). Then, it is replaced as a left part. This process is repeated until the total value of S is obtained, and the process terminates (bottom-up method). However, in a sentence written in a natural language, it is common that there are a plurality of applicable rules, and a simple method is not efficient. Therefore, in most cases, the chart method, etc. described above is used. In this example, it is ambiguous whether rule 1 is applied to all of the portion 'ART ADJ NOUN' relating to the portion 'the Japanese capital' or rule 2 is applied to the 'NOUN' corresponding to the last word 'capital'. However, only the former can finally be S. In the chart method, etc., such a redundant analysis (rule 2 in this example) can be omitted by preliminarily analyzing the rewriting rules.

Described below is the reason why the process terminates when the analysis of the syntactic dependency structure finally outputs a result of S (sentence). In the analysis of the dependency structure in linguistics, a process unit is generally a sentence because a sentence is the largest unit of language whose configuration can be formally described. In the present embodiment, a sentence can be easily recognized as a unit delimited by a period, and a dependency structure analysis process can be performed for each sentence.

Based on the analysis result of the structure of the syntactic dependency, the sentence retrieved in step S95 is analyzed into predicate phrases (simple sentences).

Whatever method is used as a method of analyzing the correspondence structure, the analysis into predicate phrases is considerably costly. However, a long sentence can be easily summarized using predicate phrases. Since a high-level meaning process is performed, a known proposition is given in a frame format shown in FIG. 15 (a frame refers to a set of a combination of an attribute name (slot name) and an attribute value (filler) and is a well-known knowledge representing method). Furthermore, a known proposition information can be compared more simply with a summary unit in the meaning network representation as shown in FIG. 16.

In the meaning network shown in FIG. 16, an underline indicates a symbol which is a unit having a meaning, and an non-underlined word followed by an arrow indicates the relationship. In FIG. 16, a symbol is expressed in Japanese. However, for example, preliminarily defining the English word 'announce' as a symbol corresponding to the Japanese word ''発表する'' allows the Japanese word to be also used as the information not only for Japanese but also for English.

As described above, it is desired to selectively use a predicate phrase and a sentence as a unit of a summary., When a summary is generated in sentence units, the analysis process into predicate phrases indicated as encompassed by dotted lines in FIG. 13, that is, the processes in steps in S94 through S102, can be omitted. These processes include the analysis into predicate phrases and the settings of the dependence between the predicate phrases.

Described below is the dependence setting process shown in FIG. 13. The dependence setting process is the process performed by the discourse structure analyzer 13, that is, the latter half of the process shown in FIG. 13. This process is sequentially performed for each of the sentences retrieved by the sentence dividing process.

The dependence between document components is set for the sentence and phrases (subordinate sentences and phrases) which themselves have low readability but can be made more readable by taking another related sentence or phrase together into a summary. The dependence is set for the following document components.

(1) A subordinate clause in a sentence

The dependence of a subordinate clause is set on a main clause, so that the main clause will be always taken into a summary whenever the subordinate clause is taken into a summary.

(2) A sentence starting with a conjunction

The dependence of a sentence with a conjunction like 'but' at the beginning is set on a preceding sentence, so that the preceding sentence will be always taken into a summary whenever the sentence with a conjunction is taken into a summary. This setting is effective when to summarize a technical document composed of relatively short sentences, especially a Japanese scientific article.

(3) A sentence in a body part with a header

The dependence of a sentence in a chapter or the like is set on the header of the chapter, so that the header will be taken into a summary whenever one of the sentences in the chapter is taken into a summary. This setting is effective when to summarize a structured document providing technical or practical knowledge, especially to help a user to find out some practical information from a manual or an encyclopedia quickly.

(4) A sentence whose subject is not well-known

The dependence of a sentence started with an unfamiliar word, especially a technical term or a proper noun; is set on the sentence that defines or describes the word, so that the sentence describing the word will be taken into a summary whenever the sentence with an unfamiliar word is taken into a summary.

The sentence describing an unfamiliar word can be found by checking the first occurrence of the word or by searching backward an occurrence of the word with an indefinite article nearby the sentence with the unfamiliar word. Since various forms of word may be used to indicate a same meaning, a word in a variant form should be also checked, especially in the case that the unfamiliar word is an acronym or another type of abbreviation.

(5) A sentence containing an anaphoric expression

The dependence of a sentence containing an anaphoric expression, such as 'it', 'she', 'that', or 'as follows', is set on the sentence where the antecedent of the expression appears, so that the sentence with the antecedent will be taken into a summary whenever the sentence with an anaphoric expression is taken into a summary.

Otherwise, it is a good idea to set some penalty to a sentence containing an anaphoric expression against being taken into a summary, especially in the case that the sentence with an anaphoric expression is an adjective sentence ('NOUN be ADJECTIVE') or a noun sentence ('NOUN be NOUN'). This is because most adjective or noun sentences describe some attributes or conditions of their subjects and many of these sentences with anaphoric subjects only inform some additional explanation or what will be described immediately after them. The present invention is intended to help a user to find out necessary information from newspapers, magazines, manuals, etc. Thus, those sentences indicating the structure of a discourse are less important than those describing some events or knowledge are.

The readability of a summary can be improved by taking extra sentences or clauses into a summary according to the dependence of the document component (1) through (5) above. However, it actually requires a computation cost to detect the dependence. Moreover, it is difficult to detect appropriately the dependence of a sentence (4) whose subject word is unknown or sentence (5) containing an anaphoric expression. The readability of these sentences is furthermore lowered if the dependence is inappropriately set. Therefore, the present embodiment shows the flow of processing the dependence set for the subordinate clause (1), the sentence (3) in a body part with a header, and the sentence (4) whose subject word is not well known to show the basic flow of processing the dependence. It also shows the flow of processing the penalty imposed on the sentence (5) containing an anaphoric expression in the process of the sentence selector 14 described later.

After dividing the sentence into predicate phrases (simple sentences) in step S95 shown in FIG. 13, the dependence is set between the predicates in the syntactic dependency structure in step S96. In step S97, a predicate phrase in dependent of another predicate phrase is set as a main predicate phrase. In step S98, the main predicate phrase is added to a predicate phrase list. When a process is performed in sentence units as described above, the above described processes are omitted, and the entire sentence is regarded as a main predicate phrase. The main predicate phrase is a phrase on which another phrase depends when the dependence is set between sentences in the subsequent process. As a result, a main predicate phrase is always taken into a summary whenever one of the sentences depending on it is taken into a summary.

FIG. 17 shows an example of dividing into predicate phrases and setting the dependence. In FIG. 17A, the dependence that predicate phrase 2 in sentence 1 depends on predicate phrase 1 is set. Similarly, the dependence that predicate phrase 2 in sentence 2 depends on predicate phrase 1 is set. In either sentence, predicate phrase 1 is a main predicate phrase. As shown in FIG. 17, the dependence can be set to any pairs of predicates related syntactically each other without restriction of their relation type (i.e., direct or indirect). That is, in sentence 1, the predicate 'hiita (caught)' in predicate phrase 2 is directly related to the predicate 'yasunda (was absent)' in predicate phrase 1 through the conjunctive auxiliary word 'node (since)'. On the other hand, in sentence 2, the predicate 'okuttekureta (sent)' in predicate phrase 2 is indirectly related to the predicate 'put away' in predicate phrase 1 through the noun 'letter'. In these case, the dependence is similarly set.

After the main predicate phrase is added to the predicate phrase list in step S98 shown in FIG. 13, a representative phrase of a sentence is determined in steps S99 through S102. When the process is performed in sentence units, the processes in steps S99 through S102 are not required, and the entire sentence is regarded as a representative phrase (and a main predicate phrase).

A representative phrase of a sentence refers to a phrase that is an origin of the dependence set in step S104 if the sentence depends on another sentence. It is introduced mainly to treat the topic phrase (or subject phrase) of Japanese sentences.

Basic structure of a Japanese sentence is a kind of topic-comment structure. It has a topic phrase, which basically is composed of a noun followed by a topic-making postposition 'wa', and a predicate part, which is composed of a predicate, some complement phrases, and optional adverbial phrases. But in normal Japanese discourse many Japanese sentences have no topic phrase of itself, and most of them refer to the previous topic phrase of another sentence. For example, the second sentence of 'Hanako-wa kaimono-ni dekaketa. Kireina huku-wo katta.' (in English, Hanako went out for shopping. φ bought a beautiful dress.) has no topic, and it refer to the topic phrase of the first sentence, i.e., 'Hanako-wa', as the subject of its predicate 'katta (bought)'. In the terminology of the present embodiment, the second sentence depends on the first sentence.

Suppose 'huku (dress)' is a focused word, both sentences should be taken into a summary because the second sentence containing the focused word needs to be taken into a summary. In this example, whole of the first sentence is not necessary for a user to recognize the second sentence. Only the topic phrase of the first sentence is enough. This is the reason why a topic phrase is separated from a predicate phrase appearing with it. The present embodiment divides the above example into three parts as follows: 'Hanako-wa' (topic phrase 1: the representative phrase of the first sentence), 'kaimono-ni dekaketa (went out for shopping)' (predicate phrase 1: the main predicate phrase of the first sentence), and 'Kireina huku-wo katta (bought a beautiful dress)' (predicate phrase 2: the main predicate phrase and representative phrase of the second sentence), and sets the dependence of predicate phrase 1 on topic phrase 1 and of predicate phrase 2 on topic phrase 1. Thus, the second sentence does not depend on the first sentence, but depends on the topic phrase of the first sentence. In other words, the second sentence, if necessary, will be taken into a summary with its relating topic phrase just by the same mechanism to take the first sentence as a whole into a summary.

Suppose the above example be in a section entitled with 'Memorandum of December $15^{th}$. Both sentences of the example depend on the title, in the present embodiment. If the focused word given is 'Hanako', the present embodiment takes topic phrase 1 and the title of the section into a summary at lease. But they are not enough because only 'Memorandum of December $15^{th}$' and 'Hanako-wa' do not make a sense. They need some predicates (verb). The present embodiment avoids such a nonsense summary by giving different roles to a main predicate phrase and a representative phrase. The present embodiment takes at least one main predicate into a summary, but not a representative phrase for itself. This is a reason why a topic phrase can be a representative phrase but not a main predicate phrase.

The present embodiment scores importance of each predicate phrase list that starts with a main predicate phrase and includes plurality of predicate phrases and topic phrases the main predicate phrase depends on, and taken plurality of predicate phrase lists into a summary. In this case, it scores following two predicate phrase lists: (1) 'kaimono-ni dekaketa (went out for shopping)', 'Hanako-wa', and 'Memorandum of December $15^{th}$'; (2) 'Kireina huku-wo katta (bought a beautiful dress)', 'Hanako-wa' and 'Memorandum of December $15^{th}$' A list of 'Hanako-wa' and 'Memorandum of December $15^{th}$' corresponding the above described nonsense summary is no longer scored, because it does not start with a main predicate phrase. The following describes the detailed procedure of this process.

A representative phrase refers to a topic phrase or a predicate phrase which is contained in a sentence and does not depend on other predicate phrases. That is, if a topic phrase is isolated in a sentence, the topic phrase is a representative phrase. Otherwise, a main predicate phrase is a representative phrase in a sentence.

It is determined in step S99 whether or not a topic phrase exists in a sentence. If yes, the topic phrase is isolated in step S100, and the dependence is set between the topic phrase and the main predicate phrase. A topic phrase refers to a noun phrase followed by the Japanese topic maker (postposition 'wa').

FIG. 17B shows the dependence after isolating the topic phrase. In sentence 1, 'Taro-wa' is a topic phrase. Predicate phrase 2 depends on predicate phrase 1, and predicate phrase 1 depends on the topic phrase. In sentence 2, 'Hanako-wa' is a topic phrase. Predicate phrase 2 depends on predicate phrase 1, and predicate phrase 1 depends on the topic phrase. Thus, the analyzed predicate phrase and topic phrase are restructured based on the dependence by the sentence selector 14 described later, and when they are incorporated into a summary, they are grouped with a phrase on which they depend. By referring to sentence 1 shown in FIG. 17B as an example, what may be incorporated into a summary is 'Taro-wa gakko-wo yasunda (Taro was absent from school)' (topic phrase+predicate phrase 1), or 'Taro-wa kaze-wo hiitanode gakko-wo yasunda (Since Taro caught cold, he was absent from school)' (topic phrase+predicate phrase 2+predicate phrase 1).

After isolating the topic phrase and setting the dependence in step S100, the topic phrase is defined as the representative phrase of the sentence in step S101, and control is passed to the process in step S103. Unless no topic phrase exists in the sentence in step S99, the main predicate phrase is defined as the representative phrase of the sentence in step S102, and control is passed to the process in step S103.

In steps S103 and S104, the dependence between sentences set in the document structure analyzing process is converted into the relationship between predicate phrases. This process is performed only when a sentence is included in a portion subordinate to a header, etc. (dependent block of the body of a document). In step S103, it is determined whether or not the sentence being processed is an element in a dependent block. If yes, the dependence is set between the representative phrase of the sentence being processed and the main predicate phrase corresponding to the portion on which a block depend in the document structure in step S104. Then, control is passed to the process in step S105. If it is determined in step S103 that the sentence is not an element in the dependent block, the process in step S104 is omitted and control is passed to the process in step S105. Since only typical processes are described here, there is no steps in which the dependence is set when the sentence being processed depends on a sentence after the sentence being processed. If such a process is required, a condition of specifying a dependent-on sentence and a representative phrase of a subordinate sentence should be stored and the dependence be set when a sentence satisfying the condition is processed.

In the last step shown in FIG. 13, that is, in step S105, the process of setting the dependence and penalty is performed based on the concept knowledge criterion. According to the present embodiment, a process of setting the dependence of a topic phrase containing an unfamiliar word on the first sentence where the unfamiliar word appears, and a process of imposing a penalty on a sentence containing an anaphoric expression are performed. After this process, control is returned to the process in step S92 and the next sentence is retrieved. If it is determined in step S93 that a sentence has been retrieved, the processes in and after step S94 are repeated. If it is determined in step S93 that no sentences have been retrieved, then the discourse structure analyzing process is terminated.

Figure 18:
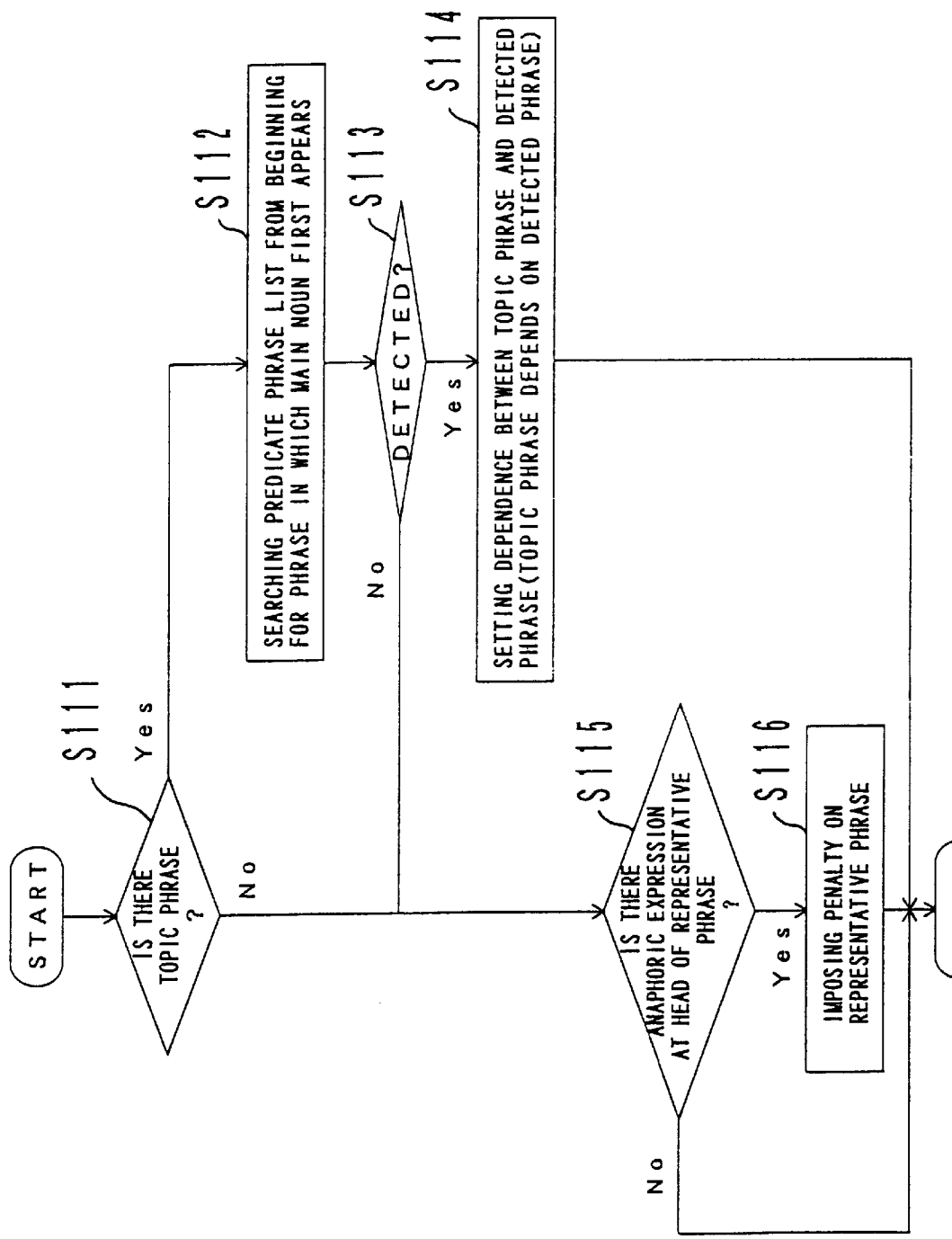
FIG. 18 is a flowchart showing the discourse analysis based on the concept knowledge criterion and the process of laying a penalty.

The process of setting the dependence and penalty in step S105 based on the concept knowledge criterion is described further in detail by referring to FIG. 18. When the process starts as shown in the flowchart in FIG. 18, it is determined in step S111 whether or not a topic phrase exists. If yes, the predicate phrase list is searched from the beginning in step S112 for a phrase in which a main noun first appears. It is determined in step S113 whether or not such a phrase has been detected. If yes, the dependence is set between the topic phrase and the detected phrase on which the topic phrase depends, and the process terminates.

If no topic phrase is detected in step S11, or if no phrase containing a main noun of the topic phrase is detected in the predicate phrase list in step S113, then it is determined in step S115 whether or not an anaphoric expression exists at the beginning of the representative phrase. If yes, a penalty is imposed on the representative phrase in step S116. If not, the process in step S116 is not performed. Then, the process terminates.

After the discourse structure analyzing process shown in FIG. 13 has been completed, the sentence selector 14 performs the sentence selecting process. In the sentence selecting process, the sentence selector 14 selects a plurality of important predicate phrases to be taken into a summary from the predicate phrase list constructed by the discourse structure analyzer 13, and makes a list of the selected predicate phrases, called selection result list. The flowchart of the process is shown in FIG. 19.

Figure 19:
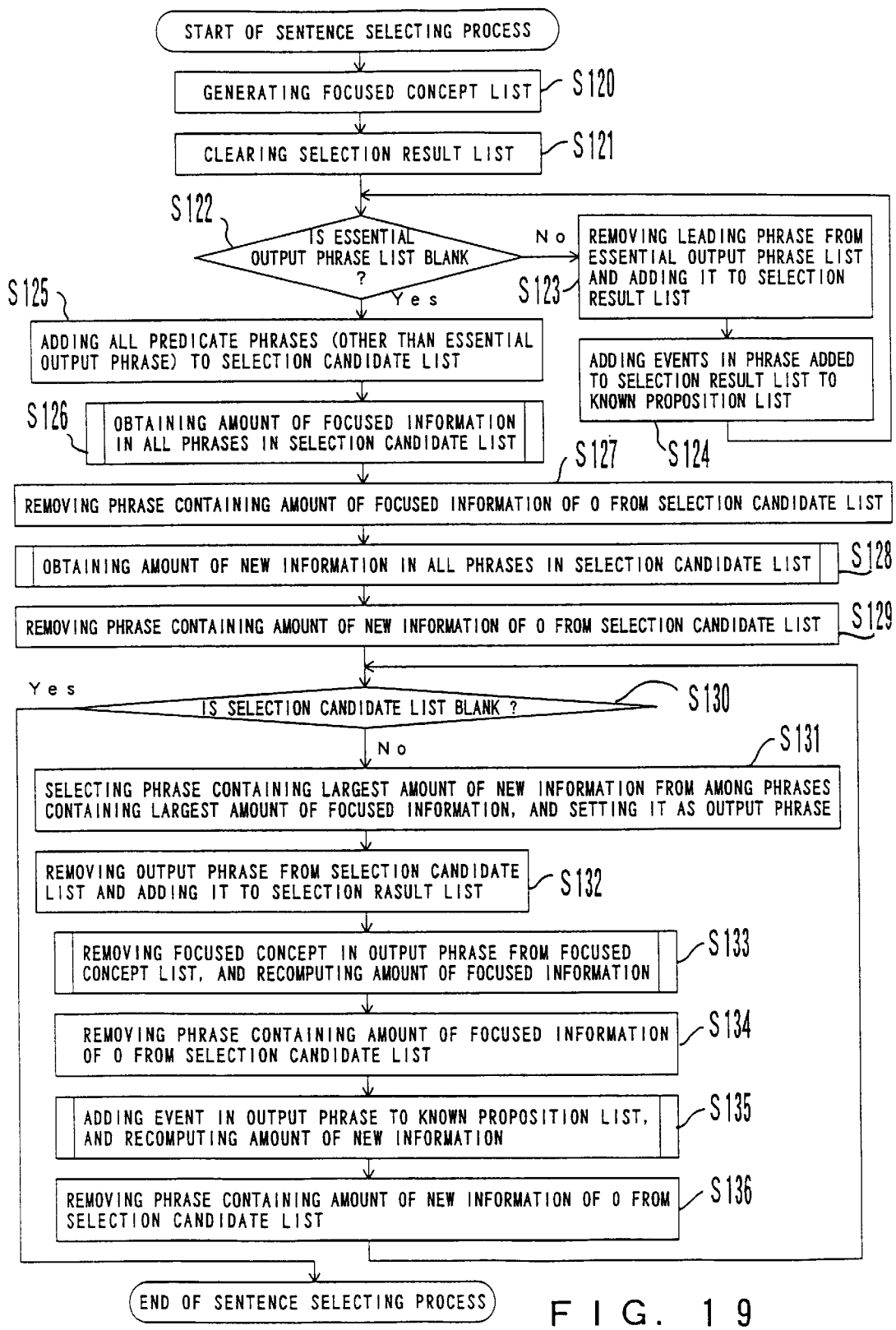
FIG. 19 is a detailed flowchart showing the sentence selecting process.

In FIG. 19, the focused information is processed as a focused concept list. According to the present embodiment, the focused concept list comprises nouns which express important concepts (i.e., user-focused or author-focused concepts) for summarization, and the amount of focused information of a predicate phrase, which is the first measure to determine the importance of a predicate phrase, is computed by counting the occurrences of these nouns in it (describe later). Alternatively, it is possible to compute the amount of focused information by counting the occurrences of not only the nouns exactly matching an item of a focused concept list but also the synonyms of them. For example, if there is a word PC in the focused concept list, the occurrences of personal computer can be used to compute the amount of focused information. (This is a reason why the noun list is called a focused concept list, but not a focused word list.)

When the process starts in FIG. 19, a focused concept list is generated in step S120 and the selection result list is cleared in step S121. The focused concept list is constructed based on the noun list provided by the summary process controller 10, by adding nouns in the author-focused portion of a document, which the document structure analyzer 11 labelled according to the extraction condition of focused information.

Then, it is determined in step S122 whether or not the essential output phrase list is blank. If not, a process of adding essential output phrases to a selection result list is performed in steps S123 and S124. An essential output phrase refers to a predicate phrase corresponding to a document element (header, etc.) instructed by the user through the summarization process controller 10 to be taken into a summary. Practically, it is a predicate phrase generated from a document element that the document structure analyzer 11 labelled as an essential output element. In step S123, the leading essential output phrase is retrieved (and removed from the essential output phrase list), and the retrieved leading phrase is added to the selection result list. In step S124, a plurality of propositions are extracted from the phrase added to the selection result list, and are added to the known proposition list, which is initially constructed by the summarization process controller, and control is returned to the process in step S122.

At this point, the focused concepts appeared in the essential output phrase can be removed from the focused concept list. However, it is better not to do so, because an essential output element is normally a header or the like and not a complete sentence in most cases; or it is better to remove the focused concepts appeared in the essential output phrase only when the document elements from which phrase was generated is a complete sentence.

When it is determined in step S122 that the essential output phrase list is blank, a selection candidate list is generated in step S125. The selection candidate list is a list of all predicate phrases other than essential output phrases in the predicate phrase list constructed by the discourse structure analyzer 13.

In step S126, the amount of focused information of each phrase in the selection candidate list is computed. The amount of focused information of a predicate phrase is the number of focused concepts (nouns) appearing in it. If a predicate phrase has a phrase on which it depends and which has not been taken into the selection result list, the amount of focused information of the dependent predicate phrase is the sum of the number of focused concepts appearing in the both phrases (the dependent predicate phrase and the phrase on which it depends). If there are a plurality of phrases on which a predicate phrase depends, the amount of focused information of each of them is computed in advance, and the phrase having the largest amount of focused information is used to calculate the amount of focused information of the predicate phrase. When focused concepts is assigned a weight, the number is multiplied by the weight to calculate the amount of the focused information.

The amount of the focused information is computed including the phrase on which the predicate phrase depends based on the above described concept knowledge criterion. That is, according to the concept knowledge criterion, if a proper noun repeatedly appears in a document, a summary should include the first appearing portion when it includes the second appearing portion. That is, since the discourse structure analyzer 13 sets the dependence of the second sentence on the first sentence, the sentence selector 14 computes the importance of the second sentence, that is, the amount of focused information, together with the first sentence. A practical example of this process is described later.

After removing the predicate phrase of the focused information amount φ from the selection candidate list in step S127, the amount of new information is computed for all predicate phrases remaining in the selection candidate list in step S128. The amount of new information refers to the amount of information not to be known to a user and relating to the proposition not to be contained in the already selected predicate phrase. The computation of the amount of new information is described by referring to an example shown in FIG. 20.

In FIG. 20, a set of a predicate and a-noun is referred to as new information, and the amount of the new information is computed as the number of the sets. The body of the document contains 7 propositions. Two of the propositions are shares with the header. When the header is added as an essential output element to the selection result list in step S123 shown in FIG. 19, the amount of new information contained in the body of the document is 5. In this example, a little complicated process of recognizing a set of a predicate and a noun is required, but an easier method of counting the nouns other than focused concepts (focused words) can also be adopted.

Thus, in computing the amount of new information, proposition information is modelled as a concept pair (or a concept simply) and the amount of new information can be obtained by counting the propositions not contained in the already selected predicate phrase. In another method, proposition information is modelled in a format of 5W1H elements (when, where, who, what, why, and how), and is compared with predicate phrases in the frame representation shown in FIG. 15 so that the number of the predicate phrases not matching the known propositions is defined as the amount of new information. Otherwise, the amount of new information using the above described 5W1H model is referred to as the first amount of new information, and the simple amount of new information is referred to as the second amount of new information. The first and the second amounts of new information can be used in combination. In computing the amount of new information, as in computing the amount of focused information, a dependent-on predicate phrase having the largest amount of new information is selected, and the computation is made including the dependent-on phrase. For the predicate phrase on which a penalty is imposed, the amount of the penalty is subtracted from the amount of new information.

Described below in further detail is the penalty. A sentence on which a penalty is imposed with regard to an anaphoric expression can be either an dependent-on sentence or a dependent sentence. Only the amount of new information should have a subtraction. For example, the penalty is explained with the two following sentences.

First sentence: Yesterday[1] I met Mr. Tanaka[3] in Shinjuku[2] and heard the information[4].

Second sentence: Yesterday[1] I met Mr. Tanaka[2] and heard the information[4] about his car[3].

In this example, the number of the numbered nouns is equal in the first and second sentences. However, in the first sentence, there is an anaphoric expression 'the information', and the sentence does not describe the contents of the information. The penalty on the anaphoric expression is to subtract 0.5 as the number of nouns from the amount of new information in the first sentence so that the second sentence may be selected by priority.

As a simple example, the amount of new information is counted as the number of nouns other than the focused concepts (focused words) contained in a sentence. For example, if 'Tanaka' is a focused word and the penalty of 0.5 noun is imposed on the 'information', the amount of new information of the first sentence is 2.5. Therefore, the second sentence (having the amount of new information 3.0) contains a larger amount of new information, and the second sentence is selected by priority as described later. However, if the focused words are 'Tanaka' and 'Shinjuku' in this example, the first sentence contains a larger amount of focused information, and the first sentence is selected regardless of the penalty.

When the process in step S128 terminates, the processes in steps S131 through S136 are repeated until it is determined in step S130 that the selection candidate list becomes blank after the predicate phrase having the amount of new information of 0 is removed from the selection candidate list in step S129.

In step S131, the predicate phrase having the largest amount of focused information is selected, and the predicate phrase having the largest amount of new information is defined as an output phrase. In step S132, the output phrase is removed from the selection candidate list and added to the selection result list. At this time, if the predicate phrase has a dependent-on phrase and the dependent-on phrase has not been added to the selection result list yet, then the dependent-on phrase is added to the selection result list. If other predicate phrases having an equal amount of information exist, the predicate phrases are simultaneously added as a rule. An alternative method of selecting only one phrase based on the appearance position of a predicate phrase by, for example, selecting the predicate phrase closest to the beginning of the document to be summarized can be adopted.

Thus, in the sentence selecting process, the proposition knowledge criterion is processed as a difference between amounts of new information. When there are sentences having an equal amount of focused information, a sentence having the largest amount of new information is selected. Unless there are sentences having an equal amount of focused information, the proposition knowledge criterion is not adopted.

Then, in step S133 shown in FIG. 19, a focused concept contained in an output phrase, that is, the predicate phrase added to the selection result list, is removed from the focused concept list. Based on the result, the amount of focused information for all predicate phrases remaining in the selection candidate list is recomputed. In step S134, the predicate phrase having the recomputed amount of focused information of 0 is removed from the selection candidate list. The recomputation of the amount of focused information can be performed as described above, and also can be performed by, for example, preliminarily storing the relationship between the focused concept and the predicate phrase, and performing the recomputation only on the predicate phrase containing the focused concept removed from the list and the predicate phrase depending on the predicate phrase added to the selection result list.

After the process in step S134, the proposition information contained in the output phrase, that is, the predicate phrase added to the selection result list in step S135, is added to the known proposition list, and the recomputation of the amount of new information is performed on all phrases remaining in the selection candidate list. The recomputation can be performed as described above, and also can be performed by, for example, storing the relationship between the proposition and the predicate phrase, and performing the recomputation only on the predicate phrase containing the proposition added to the known proposition list, the predicate phrase added to the selection result list, and the predicate phrase depending on the predicate phrase containing a changed amount of focused information.

After the predicate phrase having the amount of new information of 0 is removed from the selection candidate list in step S136 shown in FIG. 19, the processes in step S130 are repeated, and the process terminates when it is determined in step S130 that the selection candidate list becomes blank.

Figure 21:
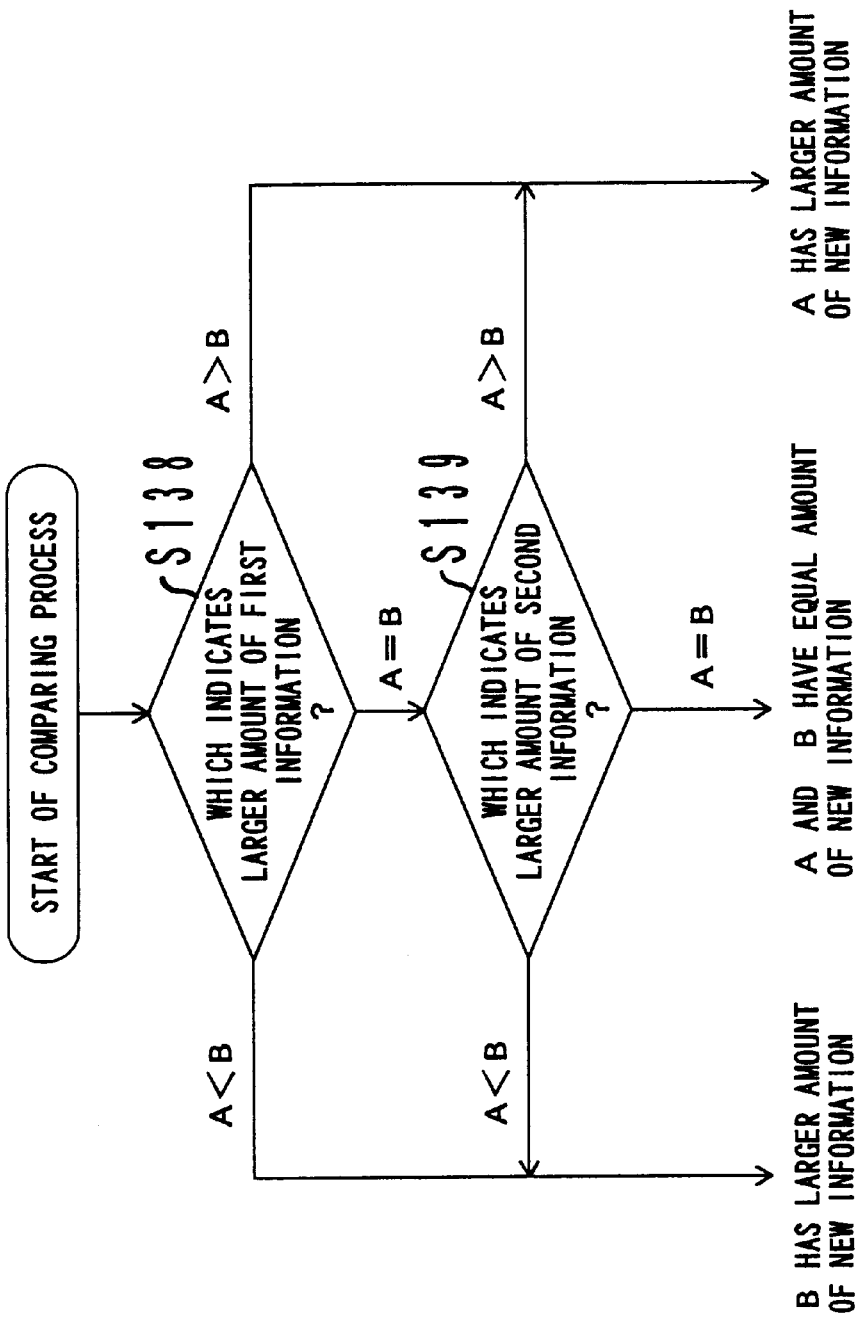
FIG. 21 is a flowchart showing the process of comparing the amount of the first new information with the amount of the second new information to distinguish the information from each other.

FIG. 21 is a flowchart showing the comparison of the amount of new information in step S131 shown in FIG. 19 when the amount of new information is divided into the first and second amounts of new information. When the amount of new information is compared between the candidate predicate phrase A and the candidate predicate phrase B as shown in FIG. 19, it is determined in step S138 which of the two predicate phrases has a larger first amount of new information. If the predicate phrase A has a larger first amount than the predicate phrase B, it is determined that the predicate phrase A has a larger amount of new information. If the predicate phrase B has a larger first amount than the predicate phrase A, it is determined that the predicate phrase B has a larger amount of new information. If the first amount of new information is equal between the predicate phrases A and B, the second amounts of new information are compared in step S139, and the predicate phrase having a larger amount of the second new information has a larger amount of new information. When the two predicate phrases A and B have an equal amount of the second new information, it is determined that these predicate phrases have an equal amount of new information.

In the description above, the penalty is imposed only on an anaphoric expression. If penalties are imposed on sentences (3) and (4) in the sentences (1) through (5) on which the above described dependence is set, words incomprehensible to the user can be prevented from being output. In this case, the process is performed as in the case where a penalty is imposed on an anaphoric expression.

Another factor of the length of a candidate phrase also can be used to determine which candidate phrase of those of the same new information should be included in a summary. That is, if a shorter predicate phrase is selected by priority from predicate phrases which have an equal amount of focused information and new information, a word incomprehensible to a user can be prevented from being output to a certain extent. Furthermore, instead of the comparison of the amount of new information, the ratio (frequency of new information) of the amount of new information to the length of the selected predicate phrase can be adopted.

A word incomprehensible to a user can be prevented from being output and processed with the computation of the amount of new information. A known concept is fundamentally processed as the dependence, but also relates to the computation of the amount of new information based on the proposition knowledge criterion. This is the reason for the concept knowledge criterion and the proposition knowledge criterion to be categorized as user's knowledge criteria.

The method of summarizing a document has been explained above in detail. Described below is the further feature of the present invention. According to the present invention, since the user-focused information and the author-focused information are considered as the focused information criteria as described above, user requested information and important information in a document are incorporated into a balanced summary. Furthermore, a simple and comprehensible summary can be generated based on the user's knowledge criteria, which comprises a concept knowledge criterion and proposition knowledge criterion.

In addition to the above described feature, the length of a summary can be automatically changed depending on the importance of a document according to the present invention. According to the conventional algorithm of generating a summary, the number of sentences or characters to be included in a summary, or the ratio of the length of the summary to the original sentence are provided as parameters in many cases. According to the present invention, a summary having an appropriate length depending on the amount of focused information appearing in a document can be generated without specifying a particular parameter. When a group of documents having different lengths are collectively summarized, it is difficult to appropriately set a parameter of, for example, a ratio of a summary. This feature is a large merit.

Next, according to the present embodiment, the restrictions on the length of a summary can be easily controlled. According to the present embodiment, no special process is considered for the length of a summary. However, when a restriction is placed on the length of a summary, it is possible to easily control the restriction. For example, when a short summary is requested, the process should be aborted in step S130 in the sentence selecting process shown in FIG. 19 before the selection candidate list becomes blank. This is realized by sequentially selecting sentences from the most important portion based on the sentence selecting process.

When a long summary is requested, an appropriate length of summary can be generated by performing a sentence selecting process according to the flowchart shown in FIG. 19 and repeating the processes in the flowchart shown in FIG. 19 on the non-selected portions. Since the phrase having the largest amount of new information is selected from the phrase having the largest amount of focused information in step S131 shown in FIG. 19, the phrase having the second largest amount of new information is selected in the second process as an output phrase. That is, based on the proposition knowledge criterion, an appropriate length of summary can be generated by taking advantage of the feature of the present invention that a redundant output is suppressed. Otherwise, a summary can be extended by sequentially fetching a more closely related portion in a method of setting all nouns in a summary obtained in the previous selecting process when the selecting process is repeatedly performed.

The present embodiment has a further feature of easily controlling other restrictions on a summary. According to the present embodiment, requirements of a summary can be described based on the two kinds of criteria, that is, the focused information criteria and user's knowledge criteria, thereby easily extending the operations of the document summarization apparatus depending on various requests. For example, in FIG. 3, the information such as the user's preference 16 and the user's knowledge 17 stored in the memory can be rearranged in various aspects depending on the user's request to use the information as the restrictions on the generation of a summary. If a summary is generated by providing the author-focused information about two documents in a form of user-focused information for use in summarizing each other's document, then one of a proposition commonly described in the two documents and a proposition described in one of the documents whichever is emphasized by the author of one of the documents can be extracted. If the author-focused information of one of two documents is used as user-focused information to summarize the other document, and vice versa, the summaries of two documents will contain both document author-focused information. Therefore, the obtained summary can be used as comparison information about a document. Thus, various requests can be fulfilled without changing the basic configuration of the summarizing apparatus.

Described below is a practical example of generating a summary using the document summarizing method according to the present invention. FIG. 22 shows a result of extracting an abstract as a summary from an abstract of a patent gazette referred to in [the Description of the Related Art] of the present specification using the following retrieval expression and the header (title of the invention).

("summary" or "abstract" or "reading" or "access") and document

The retrieval expression for the last Japanese Laid-open Patent Publication (Tokkaihei) No. 07-44566 is described as follows.

(summary or abstract or reading or access) and (sentence or text)

In FIG. 22, the portion encompassed by [ ] in the extracted abstract is a focused word. A characteristic word refers to focused information in a document to be summarized. The characteristic word is a subset of a focused word, but different in function. Among user-focused words, a word appearing in a document is significant to the user although it is not one of keywords to the document.

The conditions of generating a summary shown in FIG. 22 are listed below.

1. A noun appearing in a retrieval expression as user-focused information should be used.

2. A noun appearing in a header (title of the invention) as author-focused information should be used.

3. The concept knowledge criterion is not used.

4. A noun contained in a selected summary portion should be used as known proposition information. That is, the number of nouns contained in the candidate predicate phrase but not contained yet in the summary is defined as the amount of new information (the number of different nouns is referred to as the first amount of new information, and the total number of the nouns is referred to as the second amount of new information).

5. A header (title of the invention) is an essential output element.

FIG. 23 shows a practical example of generating a summary for explaining the effect of the concept knowledge criterion. It is an example of generating a summary of a economic report using the header as focused information. FIG. 23A shows a summary in which the concept knowledge criterion relating to the topic phrase 'Hancock' is not used. FIG. 23B shows a summary in which the concept knowledge criterion relating to the topic phrase is used. The portion added based on the concept knowledge criterion is underlined.

The conditions of generating a summary shown in FIG. 23 are listed below.

1. User-focused information should not be specified.

2. A noun appearing in a header as author-focused information should be used.

3. The concept knowledge criterion is not used in FIG. 23A, but is used relating to a topic phrase in FIG. 23B.

4. A noun contained in a selected summary portion should be used as known proposition information. That is, the number of nouns contained in the candidate predicate phrase but not contained yet in the summary is defined as the amount of new information (the number of different nouns is referred to as the first amount of new information, and the total number of the nouns is referred to as the second amount of new information).

5. A header is an essential output element.

The summary generating process shown in FIG. 23 is described further in detail below. The documents to be summarized shown in FIG. 23 are listed as follows. In these documents, sentences containing underlined characters marked with the following symbols are extracted as a summary in FIG. 23.

a sentence extracted also in FIG. 23A (◇)
a sentence newly added in FIG. 23B (☆)

○ The Apple Computer is reorganizing through the promoting of Windows compatibility.

◇ G. Amelio has reformed the organization of the company by halving the variation of the Macintosh models. As a result, the development cost can be reduced and the 3000 employees have been laid off. thereby reorganizing the Apple Computer.

☆ Amelio invites external persons to important positions of the Apple Computer, and appointed Ellen Hancock at the age of 53 to a chief technology officer, that is, the top manager in the research and development department. This is the most important position in the Apple that had been occupied by D. Nagel highly respected in this industry until he left the Apple and started as the manager of the AT&T's Bell Laboratories. It is a surprise that Hancock, who worked for IBM for 28 years, has replaced an efficient person experienced with the development of new products. It is said that Hancock may struggle with 6,000 young engineers and programmers in managing them because he is used to the management in a giant company IBM. While IBM has an approximate 5-year management plan, Apple quickly changes its management strategy as necessary. Therefore, Hancock may have a hard time in changing his tempo to the rhythm of Apple. Hancock is a master of mathematics, started as a programmer for IBM in 1966, and was promoted for his excellent management ability and got in charge of about one third of the management of IBM in 1995. However, he did not go well with L. Gerstner, left IBM, and was invited by National Semiconductor as a COO. Hancock long tried to persuade the management of IBM that IBM should purchase the notebook computers of Lotus Development, but it was not realized until Hancock left IBM. In National Semiconductor, Hancock expected to be a chief executive office as a successor of Amelio after he moved to Apple, but he left National Semiconductor because the board of directors appointed B. Halla from LSI Logic. ◇ However, since Hancock is familiar with software and a successful reorganization of Apple depends on Copland which has been delayed in development, Hancock is the right person in the right place. In Apple, he corrected the management in development and reduced errors in products, and is expected to be successful in sales to large companies.

Furthermore, Amelio appointed Marco Landi from Texas Instruments to a chief operating officer, George. Scalise from Fairchild Semiconductor through Maxtor Corp., Advanced Microdevices, etc. to a chief administrative officer, and Fred D. Anderson from MAI Systems through Automatic Data Processing Inc. to a chief financial officer.

Since Spindler, the predecessor of Amelio, tried to aggressively promote the development, a large number of important members in charge of the development departments and sections quit Apple, and a majority of them moved to Microsoft. Although S. Capps worked for Apple for 15 years and output a number of popular products such as Macintosh, etc., he decided to quit Apple 6 months ago and negotiated with some venture capitalists to found a new company. However, he was pointed out that he offered too many ideas, gave up the venture, joined Microsoft, that is, the competitor of Apple, and has started developing an internet tool and a new computer interface of Microsoft. Microsoft plans to publish Pegasus which is the OS for a hand-hold computer such as Newton by the end of this year, and Capps is collaborating for easier operation. W. Smith, who developed Newton with Capps, also moved to Microsoft. Since Gates requests for an interface of a further easier operation, they follow his strategy. However, Windows is new to them and Windows 95 has five different methods for performing the same process. Therefore, it is hard to simplify the entire operation.

Amelio seems to take a reasonable action to successfully reorganize Apple, but it will take at least one full year to output an apparent result. However, the sales of Macintosh has slowed down. The sales amount of Apple in the quarter ending with March, 1997 is $2.8 billion, that is, 9.7% reduction from the corresponding period of the last year. It has been estimated in the industry that the number of Macintosh sold in the quarter ending with June will decrease by 20%. According to the survey of 1,000 personal computer shops by Computer Intelligence, a survey company, the sales in number in April and May in the U.S. slowed down much more severely than the sales in number of Apple, and marked 29% and 27% reduction respectively in April and May from the corresponding months of the last year. The sales amounts decreased by 31% and 33% in April and May respectively from the corresponding months of the last year. This is partly attributed to the slowdown of the sales in the entire personal computer industry and a large number of recall of defective Macintosh in spring this year. However, according to Merisel Inc., Macintosh sells well as before. In the entire personal computer industry, each of the sales in April and May increased by 10% and the sales in number increased by 3%. A severe decrease was marked in sales to large companies. After checking 3,000 companies in each of which Macintosh occupies a quarter through a half of the total number of personal computers, new personal computers were purchased by 33% of the companies in February, but decreased by 14% in April. Compu USA Inc., the largest personal computer chain store in the U.S., marked 50% reduction in the sales of Macintosh, but the sales of notebook computers stopped partly because of the recall of some models. Little hardware or software of Macintosh is sold at retail stores because users can buy them cheaper through mail order sales companies. The largest mail order sales company is Micro Warehouse with the annual sales of $1.8 billion half of which is occupied by Macintosh hardware and software. They provide an excellent service for users. If an order is placed by 22:00 on the phone or by facsimile, the ordered product is delivered the next day at the delivery fee of $3. Micro Warehouse marked 60% increase of sales of Macintosh in January, but an equal sales amount as compared with the sales in the corresponding month of the last year.

According to Dataquest, Macintosh has the largest share in the multimedia market in the world, marked 3,950,000 in number in 1995 (2,400,000 in 1994) followed by Packard Bell with 3,000,000 (2,950,000 in 1994), Compaq with 2,900,000 (1,200,000 in 1994), IBM with 1,600,000 (800,000 in 1994), NEC with 1,500,000 (500,000) in 1994). Apple has the largest market share of 22.9%, followed by 19.2% by Packard Bell, 11.9% by Compaq, 8% by IBM, 4.3% by NEC, 2.7% by Acer, 0.7% by Escom, 0.6% by Fujitsu, 0.6% by Highscreen, and 29.1% by the other vendors.

In May, Apple released a new OS operating on a chip built in a digital camera and other image processing apparatus. It is a part of Quick Time IC (image-capture) technology, and is used as a multitasking OS for Motorola's chip MPC823 and contains an API for image-capture. Today, manufacturers of digital cameras design unique ASICs and have to individually develop an interface for each image processing software such as Photoshop for Adobe, EasyPhoto for Storm Software, etc. Using QuickTime IC, the manufacturers of digital cameras can skip such jobs and reduce the price of digital cameras. Apple has developed it with large companies manufacturing digital cameras and image processing devices, and now is supported by ten or more companies. Using this, an image can be directly sent from a digital camera to Internet without using a personal computer, images can be captured at different times by the script in a camera, or a filter of a Photoshop can be operated.

Apple is promoting an active strategy for Macintosh-compatible products, and plans to deliver the products starting summer. A new logic board of Macintosh internally called 'Tanzania' is scalable and cheap, and is expected to attract a firm which is interested in manufacturing Macintosh-compatible products. Motorola has already finished the trial production of Tanzania, and demonstrated the production. Tanzania is used for a lower and a middle order models and provides options in a wide range. Up to 200 MHz of PowerPC603e and 604e can be used, and there are 3 through 5 PCI slots. A user can select either a PS/2 keyboard or an ADB connector, and either an enhanced IDE (integrated Drive Electronic) or an SCSI internal hard drive. In addition to connectors such as LocalTalk GeoPort, SCSI, etc., Apple first released an ATADI (AT attachment packet interface) CD-ROM drive. Tanzania can also be released for a standard manually-ejecting type personal computer using Intel's chip in addition to an automatically ejecting type floppy drive. Two DIMM slots and two SIMM slots are provided, and RAM of up to 160 Mbytes can be used, but EDO DRAM is used actually. Compatible product manufacturers can deliver personal computers using Tanzania at the beginning of the next year. Apple is promoting the Macintosh license strategy by switching from an exclusive Macintosh-compatible product to a PPCP in three steps. In the first step, Apple aimed at providing an exclusive Macintosh-compatible product. In 1995 and 1996, DayStar Digital Inc., Power Computing Corp., and Umax Computer Corp. realized Power Macintosh 7500 and 9500. Umax Computer Corp. is established in January, 1997 as a result of the affiliation of the Macintosh-compatible product division of Radius Inc. to Umax Data Systems in Taiwan. The first Macintosh-compatible product is SuperMacS900 has been delivered since the beginning of June with such popularity that they are short of the products, and cannot accept the order amounting to $10 million within one month. The second step is performed from summer this year to the middle of the next year based on Power Macintosh 5400 and Tanzania board. These two are based on Low End Reference Platform (recently referred to as MacOS Licensing Design, or MLD for short). They are applicable with various standard logic circuits and peripherals, and approaching a PPCP (previously referred to as a common hardware reference platform, or a CHRP for short). The PPCP is designed to be applied to various operating systems such as OS/2, Windows 3.1, UNIX, Solaris, etc. in addition to Macintosh. The third step is performed to completely switch to the PPCP from the middle of 1997 to 1998.

Since the development of Copland based on Microkernel is extended to the middle of the next year, Apple has changed its announcement that System 7.5.3 is the last improvement of System until Copland is released, and newly announced that the OS internally called Harmony, which is designed to have a part of new functions of Copland, is to be released at the end of this year. Harmony has improvement in the support for Internet, in the graphic technology of OpenDoc, Cyberdog, QuickTime 2.5, QuickDraw 3D, etc. and in the interface expected for Copland. Additionally, a number of files can be retrieved and managed using labelled folders. Lockheed Martin Missiles and Space has 9,500 Macintoshes, and appreciates the support for Internet and OpenDoc by the next year if completed.

Users can use Harmony without changing the current software, but Copland requires a change in software at the software firm. Copland is currently referred to as System 8.

In summer this year, System 7.5.3 will be debugged, the performances of Duo23005 and PowerBook will be improved, and a system internally called Buster will be released.

According to the recent survey of Computer Intelligence InfoCorp., 87% of the users who bought Macintosh last year answered that they would buy Macintosh again next time. This indicates the highest level of users' contentment with their personal computers. The survey says 74% for Dell Computer, 72% for Hewlett-Packard, 68% for Acer, and 61% for Gateway 2000. The users satisfied with Macintosh like the OS of Macintosh while the users who use personal computers provided with Intel's chip would not change their software into Macintosh in consideration of software compatibility although they like the OS of Macintosh better.

Spindler, the predecessor of Amelio, thoroughly hates Microsoft and would not meet Gates. On the other hand, Amelio visited Gates and requested for his cooperation. As a result, they are planning to share the standard and product for a multimedia. If they have reached an agreement, the development environment of Apple's QuickTime can also be used for NT including Windows 95, the support for DirectX API, etc. ◊ If they have negotiated successfully, Microsoft will design OuickTime to be incorporated into Internet Explorer, and Apple will promote their technical support of multimedia for Windows. Apple has been ready to use QuickTime in the Windows environment, and a number of API of DirectX can be used with QuickTime. Up to now, QuickTime for Windows has only the ability of regeneration. However, 60% of video through the Web will be generated using OpenDoc, and 30% of video will be generated using the MPEG. Under the condition that the MPEG can be read through QuickTime, Microsoft indicates reality.

The relationship between the two companies has been improved in other points. In Europe, Apple puts BackOffice of Microsoft for sale to the servers of Advanced Workgroup Solutions. If the sales are successful in Europe, they will also try the same in the U.S. The relationship between them has been so improved that Microsoft promises to develop the next version of Office 97 for Macintosh. Under the circumstances that the demand for personal computer has slowed down, a cooperation between software and hardware firms is beneficial to each other.

Apple licenses Microsoft to use not only QuickTime Internet technology but also QuickTime VR (virtual reality). The technology of Microsoft for ActiveMovie is considerably delayed in development. Microsoft has not even distributed a development kit to a software firm, and is said to give up incorporating ActiveMovie into an Internet explorer. However, Apple should rewrite QuickTime to improve the support for media technology of Microsoft such as the API of DirectX. Apple is supporting the majority of the API of DirectX. In the API, Direct3D opposes QuickDraw3D of Apple. On the other hand, Intel is negotiating with Microsoft for the video technology through Internet, and persuading Microsoft that the improved video technology of Intel is much better than the video technology of Apple. In the technology of Apple, not a small amount of data should be downloaded before regenerating video. In the improved technology of Intel, video can be immediately regenerated through the improvement of the compression technology. Gates noticed that he mistakenly predicted the future of Internet and intranet, and is making every effort to compensate the delay of Internet Explorer. (End of the document to be summarized)

A noun appearing in the header is used as the focused information for use in generating a summary of the document to be summarized. That is, 'Apple Computer', 'Windows', 'to promote', and 'to reorganize' are focused words. The amount of focused information is divided into the amount of the first focused information and the second focused information. The amount of the first focused information refers to the number of different focused words, and the amount of the second focused information refers to a total number of focused words. The amounts of the first and second focused information are processed as in the comparison of the amount of new information in FIG. 21.

For simple explanation, the amount of new information is expressed by the number of nouns (content word) other than the focused words, the amount of the first new information is expressed by the number of different content words of nouns, and the amount of the second new information is expressed by a total number of content words of nouns.

FIG. 24 shows the result of the computation of the amount of focused information and the amount of new information.

The sentences are numbered from the beginning of the above described document to be summarized, and the amount of information of the sentence whose amount of focused information and the amount of new information are not 0. In a sentence, a focused word is expressed as enclosed by brackets [ ] in bold lines, and a content word of a noun other than a focused word as new information is expressed as enclosed by brackets [ ] in thin lines. The places before the decimal point indicate the number of differences, and the places after the decimal point indicate the total number of words. For example, in sentence 11, [Hancock] appears twice. This indicates that the number of differences in the amount of new information (amount of the first new information) is 8 and the total number of words (amount of the second new information) is 9.

According to the result of the computation in FIG. 24, sentence 72 is selected in step S131 shown in FIG. 19. In step S132, sentence 72 is removed from the selection candidate list and added to the selection result list. In step S133, the words 'Windows' and 'reorganization' are removed from the focused word list, and the amount of the focused information is recomputed. FIG. 25 shows the amount of information after recomputation. In FIG. 25, sentence 1 is selected in step S131 shown in FIG. 19, and is added to the selection result list in step S132. In step S133, 'Apple Computer' is removed from the focused word list, and the amount of focused information is recomputed. In this example, no sentences but sentence 1 contain 'Apple Computer' and the amounts of information of other sentences do not change.

Then, in step S131, sentence 11 is selected. In step S133, 'reorganization' is removed from the focused word list and the focused word list becomes blank. Therefore, if the amount of the focused information is recomputed, the amounts of the focused information for predicate phrases remaining in the selection candidate list are all 0. In step S134, the contents of the selection candidate list becomes blank, thereby terminating the sentence selecting process. FIG. 23A shows the result obtained in the process.

Described below is the process of obtaining the result shown in FIG. 23B. In addition to the process shown in FIG. 23A, the following process is performed.

First, when an unknown proper noun appears in a topic phrase, a dependence in which a sentence containing the proper noun first appearing in a document to be summarized is set with the sentence as a dependent-on sentence. However, in the case of a proper noun, a formal name (in this example, 'Ellen Hancock' and 'G. Amelio') may be first used, but an abbreviation (in this example, 'Hancock' and Amelio') is often used from the second and subsequent occurrences. Therefore, it is regarded that a formal name equals the abbreviation. Second, when a directive word (for example, 'this') appears in a topic phrase, a dependence is set with the immediately previous sentence as a dependent-on sentence. Third, when a dependent-on sentence relates to the dependence in the first and the second processes, a dependence is set for the subsequent dependent-on sentences in the same manner.

First, the first through third processes are performed on the sentence containing a focused word, and a dependence is set. FIG. 26 shows the dependence. For example, a dependence of sentence 11 on sentence 2 is set regarding to 'Hancock' as a topic phrase in sentence 11, and a dependence of sentence 2 on sentence 1 is set relating to 'Amelio' in sentence 2. 'Apple' and 'Microsoft' in sentences 41 and 72 respectively are proper noun. However, they are famous companies and regarded as user known concepts in the following explanation.

The computation of the amount of information with such a dependence taken into account is explained using sentence 11 as an example. The amount of information in sentence 11 is computed including the amount of information of sentences 2 and 1 corresponding to the dependence shown in (c) of FIG. 26. In this example, 'Apple' is equal to 'Apple Computer'.

FIG. 27 shows the result of the computation. Since sentence 11 contains 'reorganization' and sentence 1 contains 'Apple Computer', the amount of focused information in sentence 11 is 2 as the amount of the first focused information indicating the number of different words and 4 as the amount of the second focused information indicating the total number of words including 'Apple'. The amount of new information is 24 in number of different words and 27 in total number of words excluding 'Apple' and repetitions of 'Hancock', 'Ellen Hancock', 'G. Amelio', 'Amelio', and 'development'.

Using the computation result in FIG. 27, sentence 11 is selected in step S131 shown in FIG. 19. In step S132, it is removed together with sentences 1 and 2 from the selection candidate list and added to the selection result list. Thus, for example, the dependent-on sentence of sentence 3 has been selected, and the amount of information is computed only for sentence 3 when sentence 3 is selected next. Then, in step S133, 'Apple Computer' and 'reorganization' are removed from the focused word list, the amount of the focused word is computed, and the amounts of focused information in sentences 3 and 21 are 0. The result is shown in FIG. 28.

Based on the result in FIG. 28, sentence 72 is selected and added to the selection result list in step S131. In step S133, 'Windows' and 'promotion' are removed from the focused word list, and the focused word list becomes blank, thereby terminating the sentence selecting process. Thus, the result shown in FIG. 23B is obtained.

Last, the second embodiment of the sentence selection system according to the present invention is explained. FIG. 29 shows an algorithm of extracting a sentence in this sentence selection system. This algorithm refers to the generation of digest information about articles by extracting a sentence containing a keyword of a noun using a keyword of a noun contained in the header of newspaper articles, reports, etc.

FIG. 30 shows the correspondence between the words in the algorithm in FIG. 29 and the words in the flowchart of the sentence selecting process shown in FIG. 19. In FIG. 19, the amount of focused information is divided into the amounts of the first and second information as in the descriptions shown in FIG. 24.

For example, as compared with FIG. 22 in which a retrieval expression (question sentence) is used, FIG. 29 shows is different in that only a header is used. The differences between a header and a question sentence are described below. First, a header is a essential output element, and no sentences containing only the words appearing in the header, that is, no sentences having the amount of new information of 0, are extracted. Second, a question sentence (retrieval expression) is only a list of focused words, and a sentence containing only the words appearing in a question sentence can be extracted. That is, a question sentence itself is not contained in the selection result list, and the amount of new information is not 0.

In FIG. 30, the correspondence between the amount of new information and the total number of nouns not matching a header keyword is the same in idea as obtaining the amount of new proposition based on the number sets of focused concepts (header keywords) and the nouns in a sentence. That is, the comparison in (3) is performed on sentences containing an equal number of focused concepts (to be exact, the focused concepts not contained in the selection result list yet). Therefore, it is indicated that a set of a focused concept which has not yet appeared and a noun other than the concept is counted.

In FIG. 29, since only the header is used as a source of a focused concept, a set of focused concepts has already appeared in the header. In FIG. 19, it has already been contained in the selection result list as an essential output element. The number of sets of nouns relating to other focused concepts is obtained as a product of the number of header keywords contained in a sentence and the number of nouns other than the header keywords. If the numbers of the header keywords are the same, only the numbers of the nouns other than the header keywords are compared in (3) to compare the number of sets of nouns.

Figure 31:
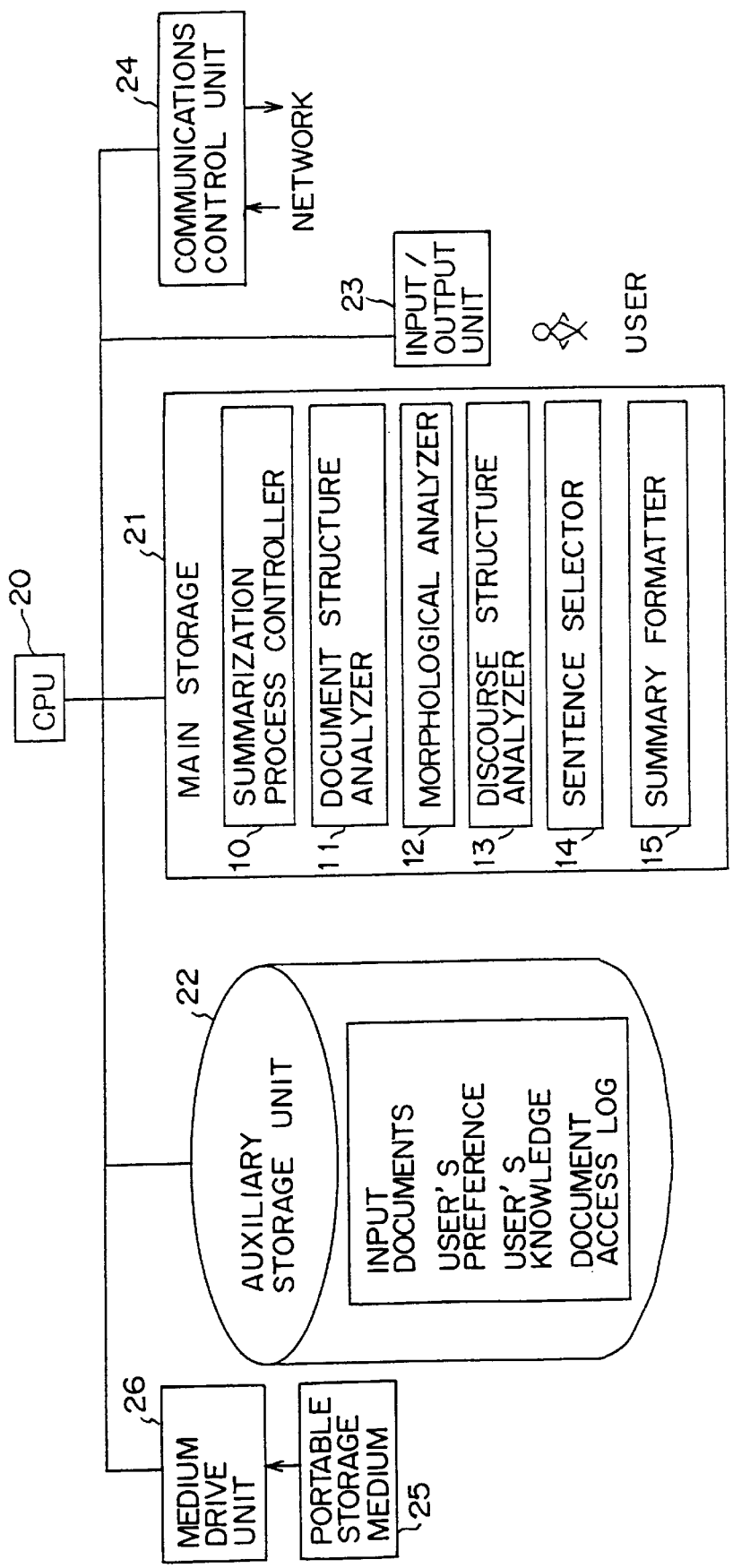
FIG. 31 shows the environment of a computer for realizing the document summarization apparatus of the present invention.

Finally explained below is a block diagram showing the configuration of the document summarization apparatus according to the present invention as a computer system, that is, a computer environment chart. FIG. 31 shows the computer environment chart. In FIG. 31, the system comprises a central processing unit (CPU) 20, a main storage 21, an auxiliary storage unit 22 such as a magnetic disk, an input/output unit 23, a communications control unit 24, and a medium drive unit 26 for driving a portable storage medium 25 such as a floppy disk, etc.

In the main storage 21, programs corresponding to the summarization process controller 10 shown in FIG. 3, the document structure analyzer 11, morphological analyzer 12, the discourse structure analyzer 13, the sentence selector 14, and the summary formatter 15 are stored. The auxiliary storage unit 22 stores the user's preference 16, the user's knowledge 17, the document access log 18, and the input document 19.

Each of the programs for realizing the document to be summarized according to the present invention can read each program as the contents of the portable storage medium 25 to the main storage 21 through the medium drive unit 26. Such programs can also be read to the main storage 21 through the communications control unit 24.

As described above, various effects can be generated from the above described features using the document summarization apparatus according to the present invention. The first and the most outstanding effect of them is that the significance (relevance) of a document can be easily determined. That is, according to the method of the present invention, both user-focused information and author-focused information can be extracted in a summary. Therefore, how the user-focused information is processed in a document can be easily determined only by reading the summary. That is, The relationship between the document and the purpose of the user can be easily determined from the summary.

The second outstanding effect is that the readability of a summary can be improved. A word unknown to a user can be output with additional explanation based on the concept knowledge criterion, and a redundant output can be suppressed based on the proposition knowledge criterion. As a result, a concise and readable summary can be generated. Furthermore, based on the user-focused information, the purpose of the user can be considered and unnecessary information to the user can be reduced. This also serves much in providing a user with a readable summary.

What is claimed is:

1. An apparatus for summarizing a document in support of selection, access, edition, and management of the document readable by a computer, comprising:

a focused information relevant portion extraction unit extracting a portion related to two types of focused information in a document to be summarized based on the two types of focused information comprising user-focused information as information focused by a user who uses a summary, and author-focused information as information emphasized by an author of the document to be summarized; and a summary generation unit generating the summary of the document to be summarized based on an extraction result from said focused information relevant portion extraction unit.

2. The document summarization apparatus according to claim 1, wherein said user-focused information equals contents of a query sentence input by the user to search said document to be summarized.

3. The document summarization apparatus according to claim 1, wherein said user-focused information and/or author-focused information are formatted in a word list or a weighted word list;

said focused information relevant portion extraction unit extracts a portion related to the two types of focused information depending on an occurrence frequency of a word in the word list in the document to be summarized.

4. The document summarization apparatus according to claim 1, further comprising:

a user's preference accumulation unit preliminarily accumulating a proposition in which the user is interested as user's preference, wherein said focused information relevant portion extraction unit uses accumulated contents of said user's preference accumulation unit as the user-focused information.

5. The document summarization apparatus according to claim 4, further comprising:

an other user's preference usage unit providing said focused information relevant portion extraction unit with information including other users preferences as the user-focused information of the user who uses the summary in a predetermined access control system, making said focused information relevant portion extraction unit extract the two types of focused information, wherein said user's preference accumulation unit accumulates the user's preferences for each of a plurality of users.

6. The document summarization apparatus according to claim 1, wherein said author-focused information, refers to a title of the document, a header of a chapter, a section, and a figure, a table of contents, and indices of words and topics, which is contained in a normally distributed document and, by which the author presents important points of the document.

7. The document summarization apparatus according to claim 1, further comprising:

an author-focused information merge unit merging each piece of author-focused information for a plurality of documents to be summarized, wherein said focused information relevant portion extraction unit extracts a portion related to the two types of focused information in the plurality of documents to be summarized according to the merged author-focused information; and said summary generation unit generates a summary of the plurality of documents to be summarized.

8. The document summarization apparatus according to claim 1, further comprising:

a document storage unit storing author-focused information specified by an author of a document or a document manager, after the document is generated, together with a document corresponding to the author-focused information, wherein said focused information relevant portion extraction unit uses the author-focused information stored in said document storage unit.

9. An apparatus for summarizing a document in support of selection, access, edition, and management of the document readable by a computer, comprising:

a summary readability improvement unit improving readability of a summary by distinguishing user known information already known to a user, and/or information known through an access log regarded as already known to a user based on a document previously presented to the user when a summary is generated, from other information than these two types of information, and by selecting an important portion in a document to be summarized; and a summary generation unit generating the summary of the document to be summarized based on a selection result from said summary readability improvement unit.

10. The document summarization apparatus according to claim 9, wherein the readability of the summary is improved by preparing the user known information and/or information known through an access log using a known concept and a known proposition and by selecting the important portion in such a way that unknown concepts in the summary are reduced and that a proposition known less among the unknown propositions can be prioritized.

11. The document summarization apparatus according to claim 10, further comprising:

a word recognition unit recognizing a word in a document; and a word knowledge determination unit determining knowledge of a word recognized by said word recognition unit, wherein knowledge of said known concept is knowledge of a word appearing in a document.

12. The document summarization apparatus according to claim 10, further comprising:

a word combination recognition unit recognizing a combination of words appearing in a document; and a word combination knowledge determination unit determining knowledge of combination of the words recognized by said word combination recognition unit, wherein knowledge of said known proposition is knowledge of a combination of words appearing in a document.

13. The document summarization apparatus according to claim 10, further comprising:

a word-predicate combination recognition unit recognizing a combination of a word and a predicate appearing in a document; and a word-predicate combination knowledge determination unit determining knowledge of combination of the word and the predicate recognized by said word-predicate combination recognition unit, wherein knowledge of said known proposition is knowledge of a combination of a word and a predicate appearing in a document.

14. The document summarization apparatus according to claim 9, further comprising:
- a user's knowledge accumulation unit preliminarily accumulating a proposition known to the user as user's knowledge, wherein
- said summary readability improvement unit uses the user's knowledge accumulated in said user's knowledge accumulation unit as the user known information.

15. The document summarization apparatus according to claim 14, further comprising:
- an other user's knowledge usage unit allowing said summary readability improvement unit to use information including other users' knowledge as user known information of a user who uses the summary in a predetermined access control system, wherein
- said user's knowledge accumulation unit accumulates user's knowledge for each of a plurality of users.

16. The document summarization apparatus according to claim 9, further comprising:
- a document access log storage unit storing as a user's document access log a document and a summary presented to a user during an operation of said document summarization apparatus and a system including said document summarization apparatus, and for providing the document access log for said summary readability improvement unit as a base of the information known through an access log; and
- a document cross-reference unit making cross-reference between the document and the summary stored by said document access log storage unit and the document to be summarized.

17. The document summarization apparatus according to claim 16, wherein said document access log storage unit stores for each user the document access log of a plurality of users covering a long time including the operation.

18. The document summarization apparatus according to claim 17, further comprising:
- an other user's document access log usage unit allowing said summary readability improvement unit to use information including information known through an access log based on other users' document access log as information known through an access log of a user who uses the summary in a predetermined access control system.

19. The document summarization apparatus according to claim 9, wherein
- said summary readability improvement unit comprises:
- a discourse structure analyzer for dividing each sentence in a document to be summarized into a predicate of the sentence and a predicate phrase basically including nouns depending on the predicate, defining a predicate phrase, among predicate phrases, independent of other predicate phrases as a main predicate phrase, isolating a topic phrase when the main predicate phrase contains the topic phrase, and setting a dependence between a topic phrase and a main predicate phrase and between a main predicate phrase and another predicate phrase according to a syntactic dependency structure in a sentence or between sentences.

20. An apparatus for summarizing a document in support of selection, access, edition, and management of the document readable by a computer, comprising:
- a focused information relevant portion extraction unit extracting a portion related to two types of focused information in a document to be summarized based on the two types of focused information, that is, user-focused information as information focused by a user who uses a summary, and author-focused information as information emphasized by an author of the document to be summarized;
- a summary readability improvement unit improving, corresponding to an extraction result from said focused information relevant portion extraction unit, readability of a summary by distinguishing user known information already known to a user, and/or information known through an access log regarded as already known to a user based on a document previously presented to the user when a summary is generated, from other information than these two types of information, and by selecting an important portion in a document to be summarized; and
- a summary generation unit generating the summary of the document to be summarized based on the selection result from said summary readability improvement unit.

21. A method for summarizing a document in support of selection, access, edition, and management of the document readable by a computer, comprising:
- extracting a portion related to two types of focused information in a document to be summarized based on the two types of focused information, that is, user-focused information as information focused by a user who uses a summary, and author-focused information as information emphasized by an author of the document to be summarized; and
- generating the summary of the document to be summarized based on an extraction result of a portion related to the two types of focused information.

22. A method for summarizing a document in support of selection, access, edition, and management of the document readable by a computer, comprising:
- distinguishing user known information already known to a user, and/or information known through an access log regarded as already known to a user based on a document previously presented to the user when a summary is generated, from other information than these two types of information, and selecting an important portion in a document to be summarized; and
- generating the summary of the document to be summarized based on a selection result of the important portion.

23. A method for summarizing a document in support of selection, access, edition, and management of the document readable by a computer, comprising:
- extracting a portion related to two types of focused information in a document to be summarized based on the two types of focused information, that is, user-focused information as information focused by a user who uses a summary, and author-focused information as information emphasized by an author of the document to be summarized;
- distinguishing, corresponding to an extraction result, user known information already known to a user, and/or information known through an access log regarded as already known to a user based on a document previously presented to the user when a summary is generated, from other information than these two types of information, and selecting an important portion in a document to be summarized; and
- generating the summary of the document to be summarized based on a selection result of the important portion.

24. A computer-readable storage medium storing a program used to direct a computer to perform, in summarizing a document in support of selection, access, edition, and management of the document readable by a computer, the following:

extracting a portion related to two types of focused information in a document to be summarized based on the two types of focused information, that is, user-focused information as information focused by a user who uses a summary, and author-focused information as information emphasized by an author of the document to be summarized; and generating the summary of the document to be summarized based on an extraction result of a portion related to the two types of focused information.

25. A computer-readable storage medium storing a program used to direct a computer to perform, in summarizing a document in support of selection, access, edition, and management of the document readable by a computer, the following:

distinguishing user known information already known to a user, and/or information known through an access log regarded as already known to a user based on a document previously presented to the user when a summary is generated, from other information than these two types of information, and selecting an important portion in a document to be summarized; and generating the summary of the document to be summarized based on a selection result of the important portion.

26. A computer-readable storage medium storing aprogram used to direct a computer to perform, in summarizing a document in support of selection, access, edition, and management of the document readable by a computer, the following:

extracting a portion related to two types of focused information in a document to be summarized based on the two types of focused information, that is, user-focused information as information focused by a user who uses a summary, and author-focused information as information emphasized by an author of the document to be summarized;

distinguishing, corresponding to an extraction result, user known information already known to a user, and/or information known through an access log regarded as already known to a user based on a document previously presented to the user when a summary is generated, from other information than these two types of information, and selecting an important portion in a document to be summarized; and generating the summary of the document to be summarized based on a selection result of the important portion.

27. An apparatus for summarizing a document in support of selection, access, edition, and management of the document readable by a computer, comprising:

a focused information relevant portion extraction unit extracting a portion related to two types of focused information in a document to be summarized based on the two types of focused information comprising user-focused information as information focused by a user who uses a summary, and author-focused information as information emphasized by an author of the document to be summarized;

a summary generation unit generating the summary of the document to be summarized based on an extraction result from said focused information relevant portion extraction unit; and said author-focused information, refers to a title of the document, a header of a chapter, a section, and a figure, a table of contents, and indices of words and topics, which is contained in a normally distributed document and, by which the author presents important points of the document.

28. An apparatus for summarizing a document in support of selection, access, edition, and management of the document readable by a computer, comprising:

focused information relevant portion extraction means for extracting a portion related to two types of focused information in a document to be summarized based on the two types of focused information comprising user-focused information as information focused by a user who uses a summary, and author-focused information as information emphasized by an author of the document to be summarized; and summary generation means for generating the summary of the document to be summarized based on an extraction result from said focused information relevant portion extraction means.

29. An apparatus for summarizing a document in support of selection, access, edition, and management of the document readable by a computer, comprising:

summary readability improvement means for improving readability of a summary by distinguishing user known information already known to a user, and/or information known through an access log regarded as already known to a user based on a document previously presented to the user when a summary is generated, from other information than these two types of information, and by selecting an important portion in a document to be summarized; and summary generation means for generating the summary of the document to be summarized based on a selection result from said summary readability improvement means.

* * * * *